US011156379B2

(12) United States Patent
Lee et al.

(10) Patent No.: US 11,156,379 B2
(45) Date of Patent: Oct. 26, 2021

(54) AIR CONDITIONER SYSTEM

(71) Applicant: LG ELECTRONICS INC., Seoul (KR)

(72) Inventors: Hakrae Lee, Seoul (KR); Hanbae Jeon, Seoul (KR); Jinho Kim, Seoul (KR); Sunyoung Park, Seoul (KR); Chulmin Park, Seoul (KR); Seontae Yoon, Seoul (KR); Kyungdo Lee, Seoul (KR); Kwonhyung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 186 days.

(21) Appl. No.: 16/233,480

(22) Filed: Dec. 27, 2018

(65) Prior Publication Data
US 2019/0203968 A1 Jul. 4, 2019

(30) Foreign Application Priority Data
Dec. 28, 2017 (KR) .................... 10-2017-0183202

(51) Int. Cl.
*F24F 1/20* (2011.01)
*F24F 11/58* (2018.01)
(Continued)

(52) U.S. Cl.
CPC ............ *F24F 11/58* (2018.01); *F24F 1/20* (2013.01); *F24F 11/54* (2018.01); *F24F 11/74* (2018.01);
(Continued)

(58) Field of Classification Search
CPC ........ F24F 11/74; F24F 11/58; H04L 12/2838
See application file for complete search history.

(56) References Cited

U.S. PATENT DOCUMENTS 6,141,356 A * 10/2000 Gorman .............. H04L 12/2801
370/345
2011/0140972 A1* 6/2011 Besore ................ H01Q 1/2233
343/702
(Continued)

FOREIGN PATENT DOCUMENTS

KR  10-2010-0090928    8/2010
KR  10-2010-0123486    11/2010
(Continued)

OTHER PUBLICATIONS

Korean Office Action dated May 13, 2019 issued in Application No. 10-2017-0183202.
(Continued)

*Primary Examiner* — Elizabeth J Martin
*Assistant Examiner* — Nael N Babaa
(74) *Attorney, Agent, or Firm* — KED & Associates LLP

(57) ABSTRACT

Disclosed is an air conditioner system comprising at least one outdoor unit and a plurality of indoor units. The plurality of units may be grouped into one or more groups. A wireless communication module may be provided at each of the plurality of units and configured to perform wireless communication using a Sub-GHz frequency band. The wireless communication module may include an encoder configured to encode a predetermined signal, a modulator configured to modulate the encoded signal according to Orthogonal Frequency Division Multiplexing (OFDM) using multiple subcarriers, at least one antenna having an antenna pattern formed on a Printed Circuit Board (PCB), and configured to output a signal based on the modulated signal, a demodulator configured to demodulate a signal received at the at least one antenna, according to the OFDM, and a decoder configured to decode the demodulated signal. Accordingly, a high-quality wireless communication environment may be implemented.

20 Claims, 14 Drawing Sheets

(51) Int. Cl.
*F24F 11/54* (2018.01)
*H04L 12/28* (2006.01)
*F24F 11/74* (2018.01)
*F24F 11/84* (2018.01)

(52) U.S. Cl.
CPC .......... *F24F 11/84* (2018.01); *H04L 12/2838* (2013.01)

(56) References Cited

U.S. PATENT DOCUMENTS

| | | |
|---|---|---|
| 2011/0286497 A1 | 11/2011 | Nervig |
| 2012/0232815 A1* | 9/2012 | Kang .................. G01R 21/133 |
| | | 702/61 |
| 2013/0297080 A1 | 11/2013 | Ko et al. |
| 2016/0315651 A1* | 10/2016 | Hong ....................... H01Q 9/42 |
| 2018/0166794 A1* | 6/2018 | Raphaeli ............... G01S 13/347 |

FOREIGN PATENT DOCUMENTS

| | | |
|---|---|---|
| KR | 10-2011-0040051 | 4/2011 |
| KR | 10-2013-0143125 | 12/2013 |
| KR | 10-2014-0099020 | 8/2014 |
| KR | 10-2016-0061208 | 5/2016 |
| WO | WO 2012/099372 | 7/2012 |

OTHER PUBLICATIONS

European Search Report dated May 24, 2019 issued in Application No. 18211575.8.
Korean Notice of Allowance dated Feb. 17, 2021 issued in Application 10-2017-0183202.

* cited by examiner

FIG. 12

|      | 0°    | 90°   | 180°  | 270°  |
|------|-------|-------|-------|-------|
| Pole | 99.9% | 63%   | 95%   | 14%   |
| PCB  | 100%  | 99.9% | 99.9% | 100%  |

FIG. 13

| Modulatioin Type | | 2FSK | 2GFSK | Filtered 2FSK | OQPSK | OFDM |
|---|---|---|---|---|---|---|
| Impedance | | 49Ω − j4 | | 50Ω | | |
| Speed (kbps) | | 100 | 160 | 50 | 150 | 150 |
| Distance /Success Rate | Outdoor Area | 100m | 500m | 100m | 100m | 800m |
| | Building A | ½Floor | 1¼Floor | 1Floor | ⅔Floor | 1¾ +1Floor |
| | Building B | ⅔Floor | ¾Floor | − | − | 3 Floors (Vertical 18 Floors) |
| Number of Available Channels | | 20 | 20 | 20 | 20 | 20 |
| Obstacle Success Rate Deviation | | − | −50% | − | − | Equal to or less than −1% |

AIR CONDITIONER SYSTEM

CROSS-REFERENCE TO RELATED APPLICATION(S)

This application claims the priority benefit of Korean Patent Application No. 10-2017-0183202, filed on Dec. 28, 2017 in the Korean Intellectual Property Office, the disclosure of which is incorporated herein by reference.

BACKGROUND

1. Field

The present disclosure relates to an air conditioner system and, more particularly, to an air conditioner system in which units are capable of performing wireless communication with each other.

2. Background

Air conditioner systems in which units are configured for wireless communication are known. However, they suffer from various disadvantages.

BRIEF DESCRIPTION OF THE DRAWINGS

The embodiments will be described in detail with reference to the following drawings in which like reference numerals refer to like elements wherein:

FIGS. 9 to 17 are diagrams illustrating configuration and operation of an air conditioner system according to an embodiment of the present disclosure.

DETAILED DESCRIPTION

Figure 1:
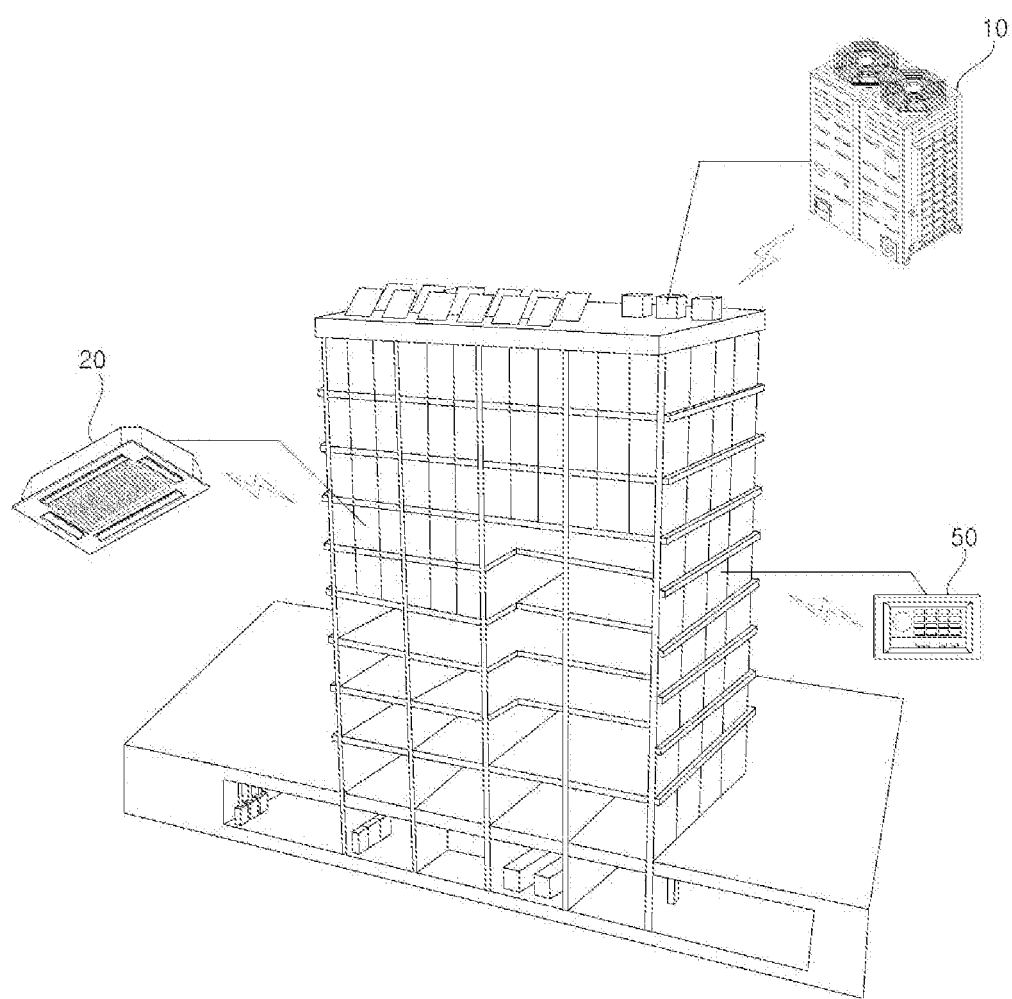
FIG. 1 is a diagram schematically illustrating configuration in which an air conditioner system according to an embodiment of the present disclosure is installed in a building.

In the drawings, in order to clearly and briefly describe the disclosure, parts which are not related to the description will be omitted and, like reference numerals refer to like elements throughout.

In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other.

An air conditioner may provide a comfortable indoor environment for occupants by discharging cold air to a room to adjust an indoor temperature and purify air of the room to create a pleasant indoor environment. The air conditioner may include an indoor unit including a heat exchanger and may be installed in a room. The air conditioner may also include an outdoor unit including a compressor, a heat exchanger, and the like, and the outdoor unit may supply a refrigerant to the indoor unit.

The air conditioner, in which the indoor unit including the heat exchanger and the outdoor unit including the compressor, the heat exchanger, and the like, are separately controlled, may be operated by controlling power supplied to the compressor or the heat exchanger. The outdoor unit and the indoor unit may be connected by a refrigerant pipe. Compressed refrigerant from the compressor of the outdoor unit may be supplied to the heat exchanger of the indoor unit through the refrigerant pipe. Heat-exchanged refrigerant in the indoor unit's heat exchanger may flow back into the outdoor unit's compressor through the refrigerant pipe. As a result, the indoor unit may discharge the cold or hot air into the room via the heat exchange using the refrigerant.

Units included in an air conditioner system may be interconnected in a building or in small groups, may transmit and receive data, and may monitor a condition of their own based on the transmitted and received data.

In one example, an air conditioner system may employ a wired communication method by which each unit is connected to one another unit via a communication line. Generally, an indoor unit transmits data to an outdoor unit, and the outdoor unit receives the data from the indoor unit and transmits the received data to a controller.

In one example, an air conditioner may be configured for wirelessly receiving data on an operation state of the air conditioner so that it is not necessary to connect to another device, such as a laptop, in order to transmit the data through wired communication.

Here, a terminal existing within a predetermined distance from an outdoor unit and an indoor unit may wirelessly communicate with the outdoor unit and the indoor unit and receive data on an operational state of each of the outdoor unit and the indoor unit.

In such a structure for communication, the indoor unit necessarily communicates with a controller through the outdoor unit, rather than communicating directly with the controller. For example, even when data on one particular indoor unit is needed, in-phase (or serial) communication is performed to pass the data through the outdoor unit, which may prolong the processing time.

In addition, it is not necessary to additionally equip an outdoor unit with an additional wireless communication module, and such an outdoor unit and an indoor unit perform wired communication.

In addition, Wi-Fi communication between the outdoor unit and the terminal lacks range, especially through walls, and communication is smooth and available only on the same floor or within a short range.

In particular, in a general installation condition where an outdoor unit is installed at a basement or a rooftop of a building, wireless communication is difficult due to a distance between an indoor unit and the outdoor unit. In addition, a signal quality may be degraded as the signal is attenuated due to obstacles inside the building. As a result, communication stability is deteriorated.

Recently, more and more attempts are made for wireless communication between units, so there are increasing cases in which a wireless network is configured between not just units, such as an indoor unit, an outdoor unit, a controller, etc., but also other devices, such as a mobile terminal.

Wireless communication in air conditioning system are desirable for various advantages, for example, since it is possible to check information of the devices and control the devices without being limited to where a user and the devices are located. However, there is a need for an improved wireless communication method which is suitable for an environment in which an air conditioner system is installed.

FIG. 1 is a diagram schematically illustrating configuration in which an air conditioner system according to an embodiment of the present disclosure is installed in a building.

An air conditioner system may include an outdoor unit 10, an indoor unit 20, and a controller 50. In addition to the indoor unit and the outdoor unit, the air conditioner system may include a ventilator, an air purifier, a humidifier, a heater, etc. and may further include other units, such as a chiller, an air conditioning unit, and a cooling tower, depending on a size of the air conditioner system. In addition, the air conditioner system may be operatively connected to a mobile device, a security device, an alarm device, etc. located in the building.

The air conditioner system may include a remote control device capable of monitoring and controlling operation states of units at a remote distance. The remote control device may include a wireless communication module 120 for communicating with other units using a Sub-GHz frequency band and monitoring other units.

In this case, the remote control device may be a controller 50 capable of controlling one or more units, a wired/wireless remote controller 60, or a mobile terminal 200. The controller 50 may control operation of the indoor unit 20 and the outdoor unit 10 in accordance with an input user command, periodically receive and store data on corresponding operation states of the indoor unit and the outdoor unit, and output the operation states through a monitor screen. The controller 50 may perform operation setting, lock setting, schedule control, group control, peak control regarding power consumption, demand control, etc. of the indoor unit 20.

The outdoor unit 10 may be connected to the indoor unit 20 to supply refrigerant to the indoor unit 20. In addition, by periodically communicating with a plurality of indoor units 20, the outdoor unit 10 may transmit and receive data with respect to the plurality of indoor units 20, and change operation in accordance with an operating setting changed through an indoor unit.

The indoor unit 20 may include an electronic expansion valve for expanding refrigerant supplied from the outdoor unit 10, an indoor heat exchanger for heat-exchanging refrigerant, an indoor unit fan for allowing indoor air to flow into the indoor heat exchanger and for allowing the heat-exchanged air to be exposed to the indoor, a plurality of sensors, and control means for controlling the operation of the indoor unit.

The indoor unit 20 may include a discharge port for discharging the heat-exchanged air. The discharge port is provided with a wind direction adjusting means for closing the discharge port and controlling the direction of the discharged air. The indoor unit 20 may control the rotating speed of the indoor unit fan, thereby controlling the intake air and the air to be discharged and controlling the air flow rate. The indoor unit 20 may further include an output unit for displaying the operation state and setting information of the indoor unit, and an input unit for inputting the setting data. In this case, the indoor unit 20 may transmit setting information regarding air conditioner operation to a remote controller connected thereto, output the information via the remote controller, and receive data.

The remote controller may be connected to the indoor unit via wired communication or wireless communication to input a user command to the indoor unit, receive data on the indoor unit, and output the received data. According to a method of connection with the indoor unit, the remote controller may transmit a user command to the indoor unit and perform one-directional communication, in which data on the indoor unit is not received, or bidirectional communication, in which data is transmitted and received with respect to the indoor unit.

The outdoor unit 10 may operate in the cooling mode or the heating mode in response to data received from the indoor unit 20 connected thereto or a control command received from the controller, and supply refrigerant to the indoor unit connected thereto.

In the presence of a plurality of outdoor units, each outdoor unit may be connected to a plurality of indoor units, and supply refrigerant to a plurality of indoor units via a distributor.

The outdoor unit 10 may include at least one compressor for compressing the refrigerant and discharging the pressurized gas refrigerant, an accumulator that separates the gas refrigerant and the liquid refrigerant from the refrigerant to prevent the non-vaporized liquid refrigerant from entering the compressor, an oil collection unit for collecting oil from the refrigerant discharged from the compressor, an outdoor heat exchanger for condensing or evaporating the refrigerant via heat exchange with the outside air, an outdoor unit fan for introducing air into the outdoor heat exchanger in order to facilitate the heat exchange of the outdoor heat exchanger and for discharging the heat-exchanged air to the outside, a four-way valve that changes the refrigerant flow path according to an operation mode of the outdoor unit, at least one pressure sensor for measuring pressure, at least one temperature sensor for measuring temperature, and a control unit for controlling operation of the outdoor unit and performing communication with other units. The outdoor unit 10 may further include a plurality of sensors, valves, supercoolers, etc., but description thereof may be omitted below.

In addition, the air conditioner system may transmit and receive data with respect to another air conditioner via network connection such as the Internet. An air conditioner may access an external service center, a management server, a database, etc., via the controller, and may communicate with an external terminal via a network. The terminal may access at least one unit in the air conditioner system, and monitor and control operation of the air conditioner system as a second controller.

In addition, the outdoor unit 10, the indoor unit 20, the controller 50, and the like may wirelessly communicate directly with each other by a predetermined wireless communication method, and the outdoor unit 10, the indoor unit 20, the controller 50, and the like may wirelessly communicate directly with a mobile terminal by the predetermined wireless communication method. As a result, a user is able to monitor a state of each unit conveniently using a mobile terminal, and control each unit.

The air conditioner system according to an embodiment of the present disclosure may include a plurality of indoor units 20 performing wireless communication with each other, and at least one outdoor unit 10.

Figure 2:
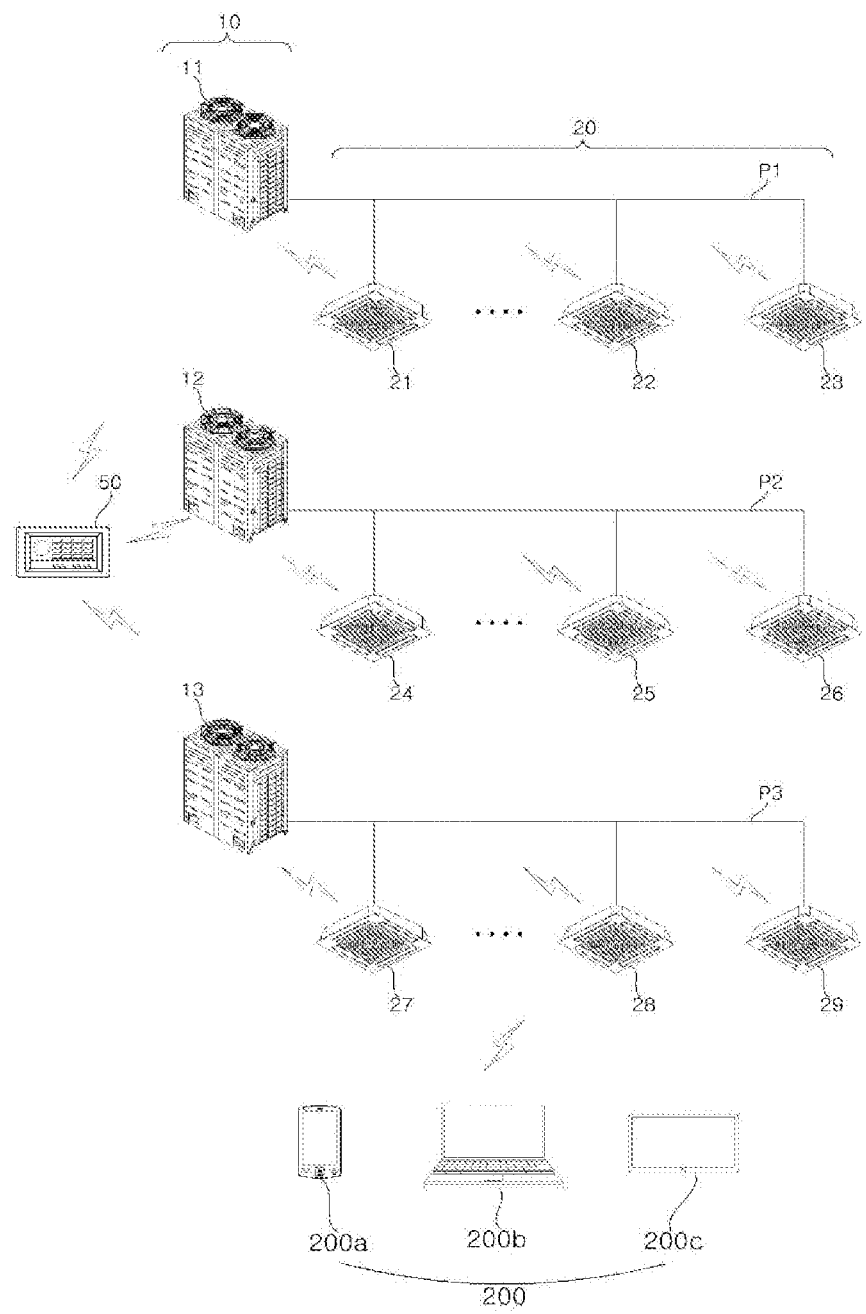
FIG. 2 is a diagram illustrating configuration of an air conditioner system according to an embodiment of the present disclosure.

FIG. 2 is a diagram illustrating configuration of an air conditioner system according to an embodiment of the present disclosure. A plurality of indoor units 20, a plurality of outdoor units 10, and a controller 50 may transmit and receive data by a wireless communication method.

The outdoor units 10 may be connected to the plurality of indoor units 20 via refrigerant pipes P1, P2, and P3, and transmit and receive data with respect to the plurality of indoor units 20 by a wireless communication method.

By periodically communicating with the plurality of indoor units 20, the outdoor units 10 may transmit and receive data with respect to the indoor units 20 and change operation according to change of operation setting of the indoor units 20.

The plurality of outdoor units 10 and the plurality of indoor units 20 may transmit and receive data by a wireless communication method. The indoor units 20 may communicate not just with the outdoor units 10, but also with the controller 50 by a wireless communication method.

A first outdoor unit 11 may be connected to first, second, and third indoor units 21, 22, and 23 via a first refrigerant pipe P1; a second outdoor unit 12 may be connected to fourth, fifth, and sixth indoor units 24, 25, and 26 via a second refrigerant pipe P2; and a third outdoor unit 13 may be connected to seventh, eighth, and ninth indoor units 27, 28, and 29 via a third refrigerant pipe P3. For convenience of explanation, each outdoor unit is described being connected to three indoor units, but it is merely exemplary and there is no limitation on the number or shape of indoor units.

Refrigerant is supplied to the first, second, and third indoor units 21, 22, and 23 from the first outdoor unit 11 upon operation of the first outdoor unit 11; refrigerant is supplied to the fourth, fifth, and sixth indoor units 24, 25, and 26 via the second refrigerant pipe P2 from the second outdoor unit 12 upon operation of the second outdoor unit 12; and refrigerant is supplied to the seventh, eighth, and ninth indoor units 27, 28, and 29 from the third outdoor unit 13 via the third refrigerant pipe P3 upon operation of the third outdoor unit 13.

Air conditioners may be grouped by an outdoor unit, and each group of air conditioners may communicate using a different channel. An indoor unit performs heat exchange using refrigerant supplied from an outdoor unit and discharges cold or hot air, and thus, the indoor unit and the outdoor units connected via a refrigerant pipe may be set as one group.

For example, the first outdoor unit 11 may form a first group with the first, second, and third indoor units 21, 22, and 23 connected thereto via the first refrigerant pipe P1; the second outdoor unit 12 may form a second group with the fourth, fifth, and sixth indoor units 24, 25, and 26 connected thereto via the second refrigerant pipe P2; and the third outdoor unit 13 may form a third group with the seventh, eighth, and ninth indoor units 27, 28, and 29 connected thereto via the third refrigerant pipe P3. An outdoor unit and a controller may form a group according to where they are installed. In some implementations, a state of connection via a refrigerant pipe may be distinguished based on whether there is a change in temperature of an indoor unit by supply of refrigerant from an outdoor when the outdoor unit and the indoor unit are operated.

Meanwhile, units belonging to the same group may perform wireless communication with each other. In addition, different communication channels in the Sub-GHz frequency band may be allocated to set groups. That is, each group uses a different communication channel for communication, thereby preventing interference. It should be appreciated that the controller 50 may communicate with the indoor units 20 or the outdoor units 10 regardless of a group.

The controller 50 controls operation of the plurality of indoor units 20 and the plurality of outdoor units 10 in response to an input user command, periodically receive and store data on corresponding operation of the plurality of indoor units and the plurality of outdoor units, and outputs an operation state through a monitor screen.

The controller 50 may be connected to the plurality of indoor units 20 to perform operation setting, lock setting, schedule control, group control, peak control regarding power consumption, demand control, etc. In addition, by communicating with the outdoor units 10, the controller 50 controls the outdoor units 10 and monitors operation of the outdoor unit 10.

In the case where the controller 50 is implemented as a plurality of controllers, the plurality of controllers may transmit and receive data with each other through mutual wireless communication and may be connected to an external controller via a predetermined network.

When a controller and a plurality of units transmit and receive data by a wireless communication method, addresses necessary for the communication may be stored in the controller and each unit. Each address may be allocated by an outdoor unit and the controller.

As described above, an outdoor unit may be grouped with indoor units connected thereto via a refrigerant pipe. In this case, addresses may be allocated to the outdoor unit and the indoor units belonging to the same group of the outdoor unit. In addition, even though a group is set with reference to an outdoor unit, communication is possible with every outdoor unit and every indoor unit. Accordingly, the controller may allocate addresses for central control in addition to addresses for communication on a group basis. In some cases, the controller may use the addresses allocated to an outdoor unit and indoor units as addresses for the central control, without allocating additional addresses.

Meanwhile, each unit of the air conditioner system, such as the outdoor units 10, the indoor units 20, and the controller 50, may wirelessly communicate with a mobile terminal 200. Referring to FIG. 2, the air conditioner system according to an embodiment of the present disclosure may further include the mobile terminal 200 which is enabled to check a condition of an electronic device (unit), such as the outdoor units 10, the indoor units 20, and the controller 50, and a condition of an electronic device in the system.

The mobile terminal 200 may be provided with an application for controlling the air conditioner system, and check and control a state of the air conditioner system by executing the application. The mobile terminal 200 may be, for example, a smart phone 200a embedded with an application for the air conditioner system, a laptop 200b, a tablet PC 200c, etc.

Figure 3:
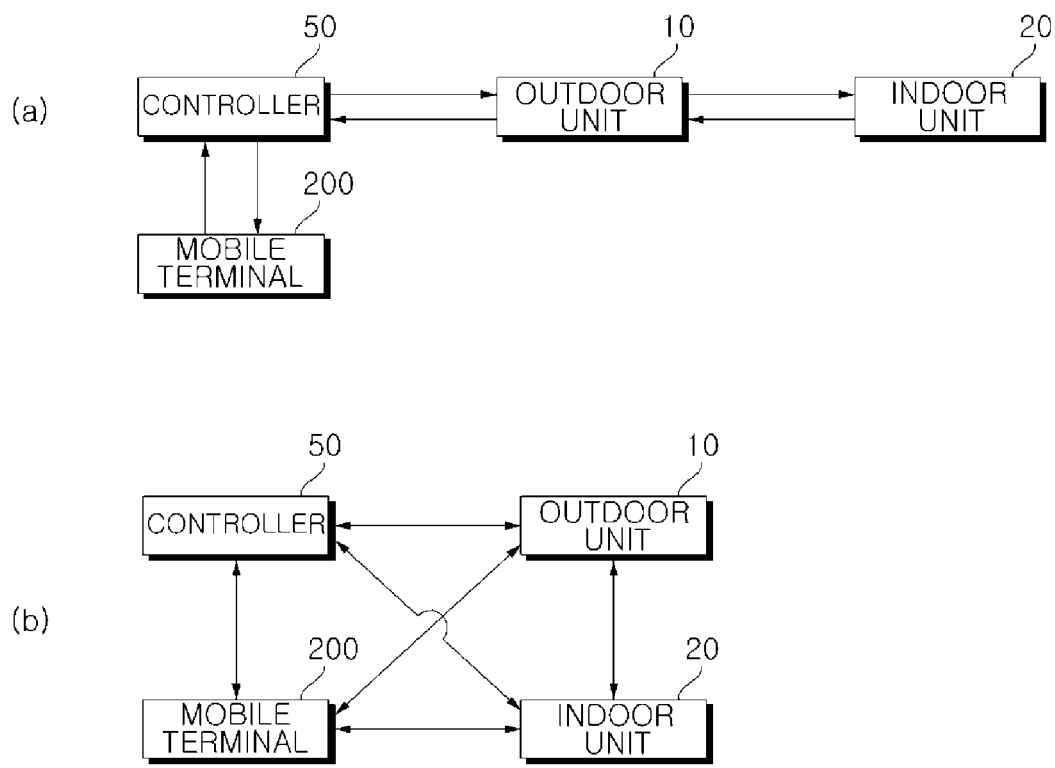
FIG. 3 is a diagram for explaining communication in an air conditioner system according to an embodiment of the present disclosure.

FIG. 3 is a diagram illustrating communication in an air conditioner system. In FIG. 3, (a) shows communication between units using wired communication, and (b) shows communication between units using wireless communication according to the present disclosure.

Referring to (a) of FIG. 3, a plurality of units in the air conditioner system is connected via communication lines. There are various disadvantages in this type of configuration. Since there is limitation in connection of the communication lines, the plurality of units is not connected one by one (directly), but is connected in phases (or series) according to a connected shape of connection lines.

A plurality of indoor units may be connected to one outdoor unit via a communication line, and the outdoor unit may be connected to the controller. When there is a plurality of outdoor units, the plurality of indoor units may be connected to the plurality of outdoor units with reference to a connected state of a refrigerant pipe. The plurality of outdoor unit may be connected to the controller.

The indoor units transmit data to an outdoor units, and the outdoor units may transmit to the controller its own data as well as the data received from the indoor unit to the controller. The controller may check an operation state of the indoor unit based on data received from the outdoor units.

In the case where the controller transmits a control command to an indoor unit, the controller transmits the control command to an outdoor unit connected to the indoor unit and the outdoor unit transmits the received control command to the indoor unit.

As such, in the case of wired communication, a plurality of units is not connected one by one. That is, each of the plurality of units are not directly connected to each of the other units. Hence, data is transmitted in phases according to a connection state of communication lines rather than directly to the desired one of the units.

Accordingly, since data of an indoor unit is not able to be transmitted directly, there may be a time delay in transmission of the data. In addition, since an outdoor unit may need to process data from another unit merely for transferring the data, the load on each unit may be increased. Furthermore, since one outdoor unit needs to process data on a plurality of indoor units, a large amount of time may be required to transmit data depending on the number of indoor units connected to the outdoor unit.

In addition, even when a state of units are monitored using the mobile terminal 200, data on an indoor unit is not able to be transmitted directly, and thus, the data may be transmitted and received via the controller 50 or the like. The mobile terminal 200 may not be capable of freely communicating with each unit of the air conditioner system, and needs to receive from a particular unit only information on the corresponding particular unit and communicate with the controller 50 of an upper layer in order to obtain whole information.

As shown in (b) of FIG. 3, an outdoor unit 10, an indoor unit 20, a controller 50, and a mobile terminal 200 transmits and receives data with respect to each other by a wireless communication method.

The controller 50 and/or the mobile terminal 200 may request data from each of the outdoor unit 10 and the indoor unit 20, and may determine an operation state or abnormality of each unit based on data received from each of the outdoor unit 10 and the indoor unit 20.

In the above, grouping an outdoor unit and an indoor in consideration of a flow of refrigerant has been described, but a communication channel including the controller, the outdoor unit, and the indoor unit may be set separately from a communication channel between the outdoor unit and the indoor unit.

The controller 50 and/or the mobile terminal 200 may change operation setting of the indoor unit based on data received from the indoor unit 20 according to a condition (temperature or humidity) of an indoor space where the indoor unit 20 is installed, and transmits data dependent upon the change of the operation setting directly to the indoor unit. In this case, when the operation setting is changed, the indoor unit 20 transmits the corresponding data to the outdoor unit and accordingly operation of the outdoor unit 10 is changed as well.

When the indoor unit 20 is scheduled to operate at a preset time, the controller 50 may transmit an operation command to the indoor unit and the outdoor connected thereto, and the indoor unit may transmit a response to the operation command to the controller 50 and transmit data on an operation state thereof at a predetermined interval.

In response to data received through an input unit or data received from the controller 50, the indoor unit 20 sets the operation and transmits data to the outdoor unit. The outdoor unit 10 controls a compressor by calculating a load according to the data received from the indoor unit and an operation state of a plurality of indoor units.

The outdoor unit 10 and the indoor unit 20 may transmit data to the controller 50 at a predetermined time interval, and transmit error or abnormality-related data to the controller 50 in response to an occurrence of an error or an abnormality, regardless of a cycle.

Figure 4:
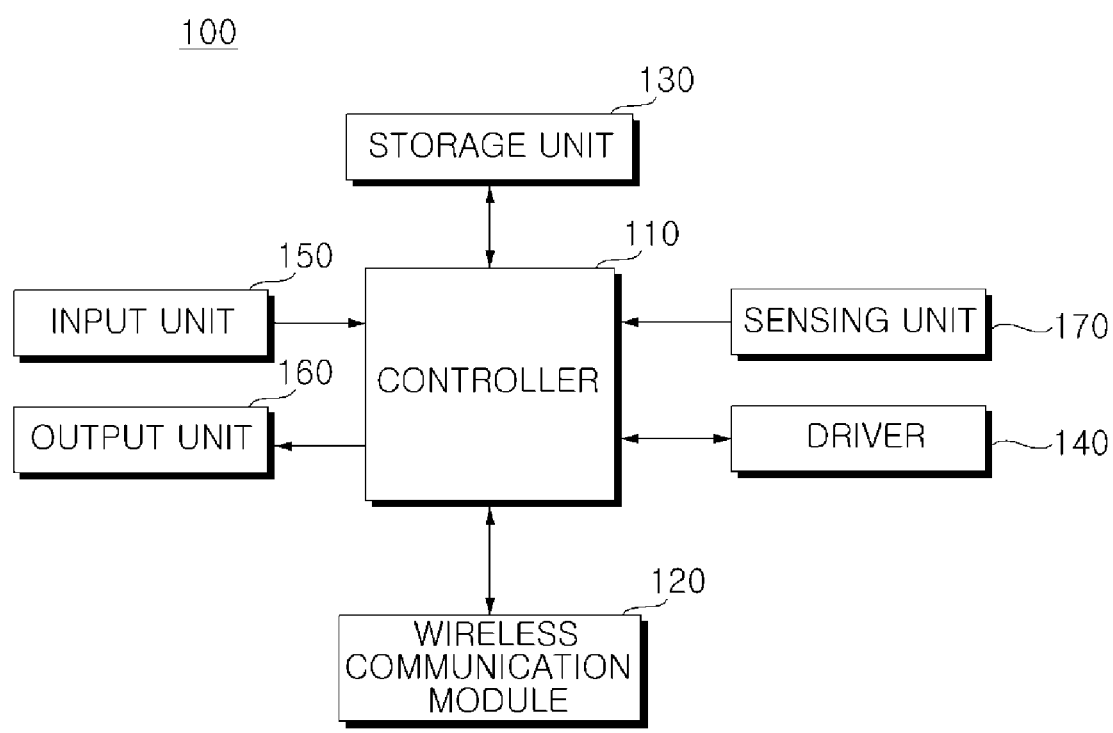
FIG. 4 is a block diagram schematically illustrating control configuration of units in an air conditioner system according to an embodiment of the present disclosure.

FIG. 4 is a block diagram schematically illustrating control configuration of units in an air conditioner system according to an embodiment of the present disclosure.

An electronic device according to an embodiment of the present disclosure may be a unit 100 in an air conditioner system. For example, an electronic device according to an embodiment may be one of an indoor unit, an outdoor unit, a controller, and a wireless sensor in an air conditioner system.

The unit 100 in the air conditioner system may include a driver 140, a sensing unit 170, an output unit 160, an input unit 150, a storage unit 130, and a controller 110 for controlling overall operation. In addition, the unit 100 may be provided with a wireless communication module 120 or may be connected to the wireless communication module 120. The wireless communication module 120 may be embedded in a unit or installed outside the unit. These are common components included in every unit 100, and an additional component may be added depending on characteristics of a product.

The indoor unit 20 may be provided with a vane as a wind direction adjusting means, and may be provided with an indoor unit fan driver, a valve controller, and a wind direction controller as the indoor unit 20 includes an indoor fan and a plurality of valves.

Meanwhile, the outdoor unit 10 may include a compressor, an outdoor unit fan, and a plurality of valves. Accordingly, drivers of the outdoor unit may be classified into a compressor driver, an outdoor unit fan driver, and a valve controller.

Meanwhile, the type, the number, and the installation positions of sensors included in the sensing unit 170 may vary depending on a type of a unit.

The storage unit 130 may store control data for controlling operation of the unit 100, communication data for setting an address necessary to communicate with another unit or setting a group, data transmitted and received with respect to the outside, and operation data generated or sensed during operation. The storage unit 130 may store an execution program of each function of the unit, data for operation control, and transmitted and received data. The storage unit 130 may be implemented in a hardware manner, as a variety of storage devices such as ROM, RAM, EPROM, flash drive, hard drive, and the like.

The input unit 150 may include at least one input means such as a button, a switch, and a touch input means. When a user command or predetermined data is input in response to manipulation of an input means, the input unit 150 transmits the input data to the controller 110. The outdoor unit may be provided with a test run key and an address setting key, and the indoor unit may be provided with a power key, a menu input key, an operation setting key, a temperature adjusting key, a wind power key, a lock key, etc.

The output unit 160 may include at least one of a lamp which is controlled to be turned on or blink, an audio output unit provided with a speaker for outputting predetermined sound, or a display so as to output an operation state of the unit. The lamp may notify whether the unit is in operation, depending on whether the lamp is turned on, which color the lamp is turned on, whether the lamp is blinking, and the speaker output an operation state by outputting predetermined alarming sound or effect sound. The display may output a menu screen for controlling the unit, and output a guidance message or an alarm related to operation setting or an operation state of the unit, wherein the guidance message or the alarm is composed of a combination of at least one of a text, a number, or an image.

The sensing unit 170 may include a plurality of sensors. The sensing unit 170 may include a pressure sensor, a temperature sensor, a gas sensor, a humidity sensor, and a flow sensor. For example, a plurality of temperature sensor is provided to sense indoor temperature, outdoor temperature, temperature of an indoor heat-exchanger, temperature of an outdoor heat-exchanger, and pipe temperature, and to input sensed values to the controller 110. The pressure sensor may be installed at an inlet port and an outlet port of a refrigerant pipe, measure pressure of flowing refrigerant and pressure of discharged refrigerant, and input measurements to the controller 110. The pressure sensor may be installed not just in the refrigerant pipe, but also in a water pipe.

The driver 140 supplies operation power to a control target in accordance with a control command of the controller 110, and controls driving of the control target. As described above, in the case of an outdoor unit, the driver 140 may be provided as a compressor driver, an outdoor unit fan driver, and a valve controller for controlling a compressor, an outdoor fan, and a valve, respectively. The driver 140 may apply operation power to motors provided in the compressor, the outdoor unit fan, the valve, etc. so that preset operations are performed upon operation of the motors.

Figure 5:
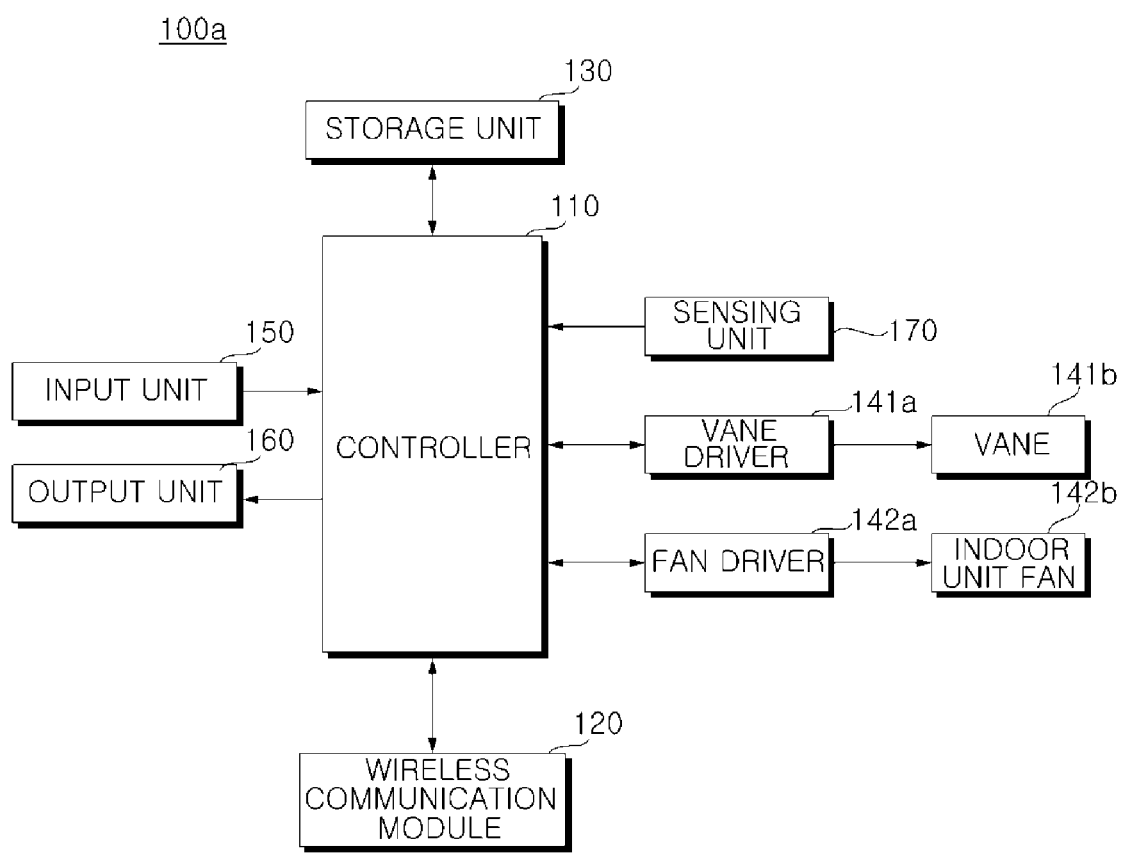
FIG. 5 is a block diagram schematically illustrating control configuration of an indoor unit according to an embodiment of the present disclosure.

FIG. 5 is a block diagram schematically illustrating control configuration of an indoor unit according to an embodiment of the present disclosure. FIG. 5 shows an example in which a unit 100 is an outdoor unit 100a and the driver 140 of FIG. 4 for the outdoor unit 100a. Hereinafter, description about components identical to the components shown in FIG. 4 are omitted.

The indoor unit 100a may include a vane driver 141a, a fan driver 142a, an indoor unit fan 142b, and one or more vanes 141b. The indoor unit fan 142b discharges cold air, which is heat-exchanged by a heat exchanger, to an indoor space through an air outlet.

The fan driver 142a may control driving of a motor that operates the indoor unit fan 142b. In response to a control signal from the controller 110, the fan driver 142a controls turning on/off of the indoor unit fan 142b and controls the indoor unit fan 142b to operate at a set speed.

In response to a control signal from the controller 110, the vane driver 141a may control opening and closing of one or more vanes 141b which is provided at one or more air outlets. In addition, the vane driver 141a may change a direction of air to be discharged by controlling an opening angle of each vane 141b. As the opening angle of each vane 141b is changed by the vane driver 141a, a direction of air to be discharged may be changed. In this case, a louver for adjusting a left-and-right direction of air may be further provided at each air outlet.

The opening angle of each vane 141b may be set within a range of 0° and 90°, and may be changed in phases according to settings. The vane driver 141a may change the opening of each vane 141b in phases in accordance with a control command of the controller 110.

For example, the vane driver 141a may control an opening angle of a vane in five phases by 15° each time within a range of 15° and 75°. The opening angle of each vane 141b may be set in three to nine phases. In addition, in a swing mode, the vane driver 141a may continuously change an opening angle of a vane by any degree in a range between 15° and 75°.

Figure 6:
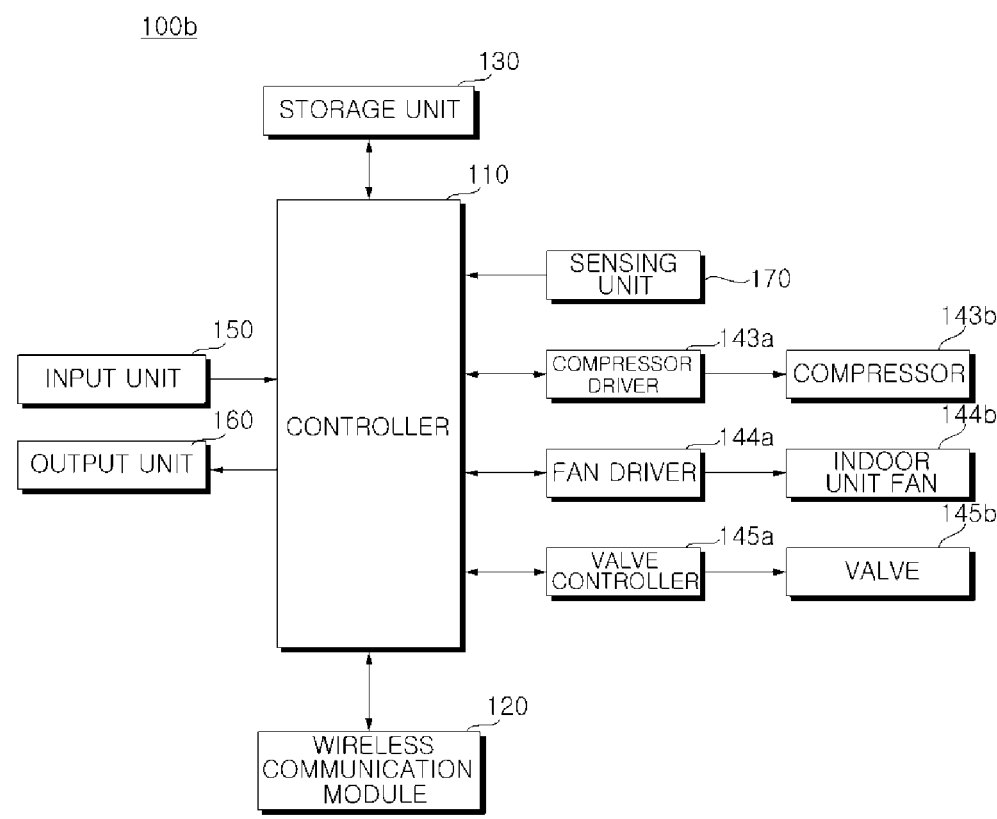
FIG. 6 is a block diagram schematically illustrating control configuration of an outdoor unit according to an embodiment of the present disclosure.

FIG. 6 is a block diagram schematically illustrating control configuration of an outdoor unit according to an embodiment of the present disclosure. FIG. 6 shows an example in which a unit 100 is an outdoor unit 100b and the driver 140 of FIG. 4 when the unit 100 is the outdoor unit 100b. Hereinafter, description about components identical to the components shown in FIG. 4 are omitted.

The outdoor unit 100b may include a compressor driver 143a, a compressor 143b, an outdoor unit fan 144b, a fan driver 144a, a valve controller 145a, and a valve 145b.

The outdoor fan 144b supplies outdoor unit to an outdoor heat exchanger in response to rotation of a fan, and helps discharge heat-exchanged cold air to the outside. The outdoor heat exchanger operates as a condenser during a cooling operation, and as an evaporator during a heating operation. Accordingly, the outdoor unit fan 144b may discharge cold air or warm air heat-exchanged by the outdoor heat exchanger.

The fan driver 144a may control driving of a motor provided in the outdoor unit fan 144b so as to control rotation of the outdoor unit fan 144b. In response to a control signal from the controller 110, the fan driver 144a may control the outdoor unit fan 144b to operate at a set rotation speed or stop from operating. The fan driver 144a may control a rotation speed of the outdoor unit fan 144b by transmitting an operation signal according to a shape of the motor provided in the outdoor unit fan 144b.

The valve controller 145a may control a flow of refrigerant or a flowing direction of refrigerant by adjusting opening/closing or a degree of opening of a plurality of valves 145b provided in an indoor unit. Since the plurality of valves 145 are provided at different locations, and thus, a plurality of valve drivers may be provided accordingly. A valve may include a four-way valve, an expansion valve, a hot gas valve, etc.

By compressing refrigerant and discharging the compressed refrigerant, the compressor 143b may help the refrigerant to circulate from an outdoor unit to an indoor unit. If low-temperature and low-pressure vapor refrigerant is flowing, the compressor 143b may compress the refrigerant to discharge high-temperature and high-pressure vapor refrigerant.

The compressor driver 143a may control operation power which is to be supplied to a motor provided in the compressor 143b, and accordingly control an operating frequency of the compressor. The compressor driver 143a may include an inverter for controlling operation of the compressor.

Referring to FIGS. 4 to 6, each unit may include a wireless communication module 120. The wireless communication module 120 may support one or more wireless communication methods, and communicate with another unit in accordance with a control command of the controller 110. The wireless communication module 120 may transmit and receive data in a wireless communication method set between the controller, the outdoor unit, and the indoor unit, and may transmit received data to the controller.

The wireless communication module 120 may set an address for communication between units, transform data to be transmitted and received, and process a signal. Upon operation of the unit, the wireless communication module 120 searches for a unit in the same frequency band through wireless communication, and verifies connection to the unit.

The wireless communication module 120 may perform communication by allocating a temporary address for an initial operation or setting a received temporary address. In addition, when setting an address in response to a control command of the controller, the wireless communication module 120 may request a product number from the controller and set an address based on the product number. The product number may be a unique number, a serial number, a Media Access Control (MAC) address, or the like of the unit.

The controller 110 may control data to be input and output trough the input unit 150 and the output unit 160, manage data stored in the storage unit 130, and control transmitting and receiving data through the wireless communication module 120. The controller 110 may sense a connection state and a communication state of the wireless communication module 120 through a connection unit, and determine an error.

The controller 110 may generate a control command to operate in accordance with a request from another unit or a set operation setting, and transmit the control command to the driver 140. Accordingly, the driver 140 may control a component connected thereto, for example, a compressor, an output unit fan, a valve, an indoor fan, a wind direction adjusting means, etc. to operate.

In addition, while a unit is in operation, the controller 110 may determine an operation state of the unit based on data received from a plurality of sensors of the sensing unit 170, and output an error.

The wireless communication module 120 may be provided inside the unit 100 or may be connected to the unit 100 via an interface. The wireless communication module 120 may receive data of the unit via the interface, and transmits received data to the unit.

Preferably, the wireless communication module 120 may perform wireless communication using a Sub-GHz frequency band so that communication is enabled despite the presence of a wall, a floor, an obstacle, etc. in a building. The Sub-GHz frequency band may be a frequency band under 1 GHz. The Sub-GHz frequency band has excellent transmission and rotation characteristics, and thus is less attenuated in response to a wall or an inter-floor object. Thus, the wireless communication module 120 is efficient to be used for communication within an air conditioner system provided with a plurality of units in a building partitioned by walls.

Meanwhile, the wireless communication module 120 may use a frequency band between 700 MHz and 900 MHz in Sub-GHz bands. For example, the wireless communication module 120 may perform communication in accordance with the IEEE 802.15.4 g standard (SUN) or the IEEE 802.11ah standard (WiFi Halow).

In addition, the wireless communication module 120 performs communication using one of the 400 MHz band and the 900 MHz band, which are unlicensed bands available for a lower power wireless station, in Sub-GHz bands. The wireless communication module 120 may selectively use the 400 MHz band and the 900 MHz band in response to a standard which is different depending on a region or country.

Considering inter-floor communication and an antenna length, it is desirable that the wireless communication module 120 performs communication using a frequency band of 900 MHz from the aforementioned frequency bands.

In some implementations, the wireless communication module 120 may further include a Zigbee module, a Bluetooth module, an NFC module, and any other communication module which is a short-range communication technology.

The wireless communication module 120 includes a plurality of communication modules, so the same communication module or different communication modules may be used for communication between an outdoor unit and another indoor unit, communication with a remote controller, and communication with the controller. The wireless communication module 120 may perform communication by a different communication method according to a target to communicate, by selectively changing the communication method in response to the target to communicate.

When different channels are used for communication with an indoor unit and communication with a controller, the wireless communication module 120 may transmit and receive data by setting a different channel according to a target to communicate.

According to the Korean radio wave act, over a frequency band of 400 MHz or 900 MHx, there are 21 channels between 424.7 MHz and 424.95 MHz and 11 channels between 447.8625 MHz and 447.9875 MHz for radio equipment of a predetermined low-power wireless station used for data transmission, and 32 channels between 917 MHz and 923.5 MHz for radio equipment of RFID/USN. Thus, communication may be performed using the above channels.

Unlicensed frequency bands used in countries are as below: 902 to 928 MHz (FCC Part 15.247) in North and South America; 433 MHz, 915 MHz, and 863-868 MHz (ETSIEN300220) in Europe; 920-928 MHz(ARIB STD-T108) in Japan; 920 MHz in China; 424-447 MHz and 917-923.5 MHz(KC) in South Korea; 865-867 MHz(G.S.R 564 (E)) in India; 433 MHZ and 915 MHZ in Australia; and 433 MHz in South Africa. Across the world, 2.4 GHz and 5.72 GHz are commonly available.

In addition, if 902-928 MHz is used in the North and South America, 863-868 MHz in Europe, 920-928 MHz in Japan, 917-923.5 MHz in South Korea, 865-867 MHz in India, and 2.74 GHz/5.72 GHz commonly across the world, communication may be possible at 50 kbps or faster.

Since various types of obstacle such as walls, floors and furniture exists in a building, it is necessary to use a frequency band which allows a signal to pass through such obstacles and reach a predetermined distance or more. The Industrial, Scientific and Medical (ISM) band (100 MHz, 20 MHz, 400 MHz, 900 MHz) in Sub-GHz bands has an excellent feature of penetrating in a building and thus enables inter-floor communication.

A length of an antenna depends on a transmitting frequency band, and since 100 MHz and 200 MHz requires a long antenna length, there are restrictions in installing the antenna in this case. In addition, even for the frequency band of 400 MHz, a longer antenna length is required compared to that of the frequency band of 900 MHz.

Therefore, it is desirable that the wireless communication module 120 performs communication using a frequency band of 900 MHz from the aforementioned frequency bands.

The air conditioner system according to an embodiment of the present disclosure may include a plurality of units. For example, the air conditioner system may include at least one outdoor unit and a plurality of indoor units. In addition, the units included in the air conditioner system may perform wireless communication with each other.

Meanwhile, considering an installation environment of the air conditioner system where an outdoor unit is installed at a basement, a rooftop, or an outdoor area, the existing short-range wireless communication such as Wi-Fi and Zigbee are not enough to smoothly perform wireless communication between units.

Thus, the air conditioner system according to an embodiment of the present disclosure may implement direct/indirect communication between units in diverse environment, such as home and a building, using a long-range wireless communication of Sub-GHz frequency bands.

In addition, considering an installation environment of the air conditioner system, in order to achieve decent communication quality reliability, it is necessary to check and apply a wireless communication modulation technique which maintains high reliability, regardless of change in a surrounding environment such as presence of an object, movement of a person, change in a building structure.

In addition, in order to install a number of units in one area by using limited wireless frequency resources efficiently, it is necessary to enhance a communication rate compared to the existing long-range wired communication.

Thus, the present disclosure proposes a long-range communication technology for communication between units in a building, which can be more easily installed with low costs, which makes possible to freely monitor the units inside the building, without any restriction to space, and to which the optimal solution of wireless communication capable of passing through any wall and floor of the building is applied.

To this end, a plurality of units included in the air conditioner system according to an embodiment of the present disclosure may each include a wireless communication module 120 which communicates with the plurality of units using a sub-GHZ frequency band.

Figure 7:
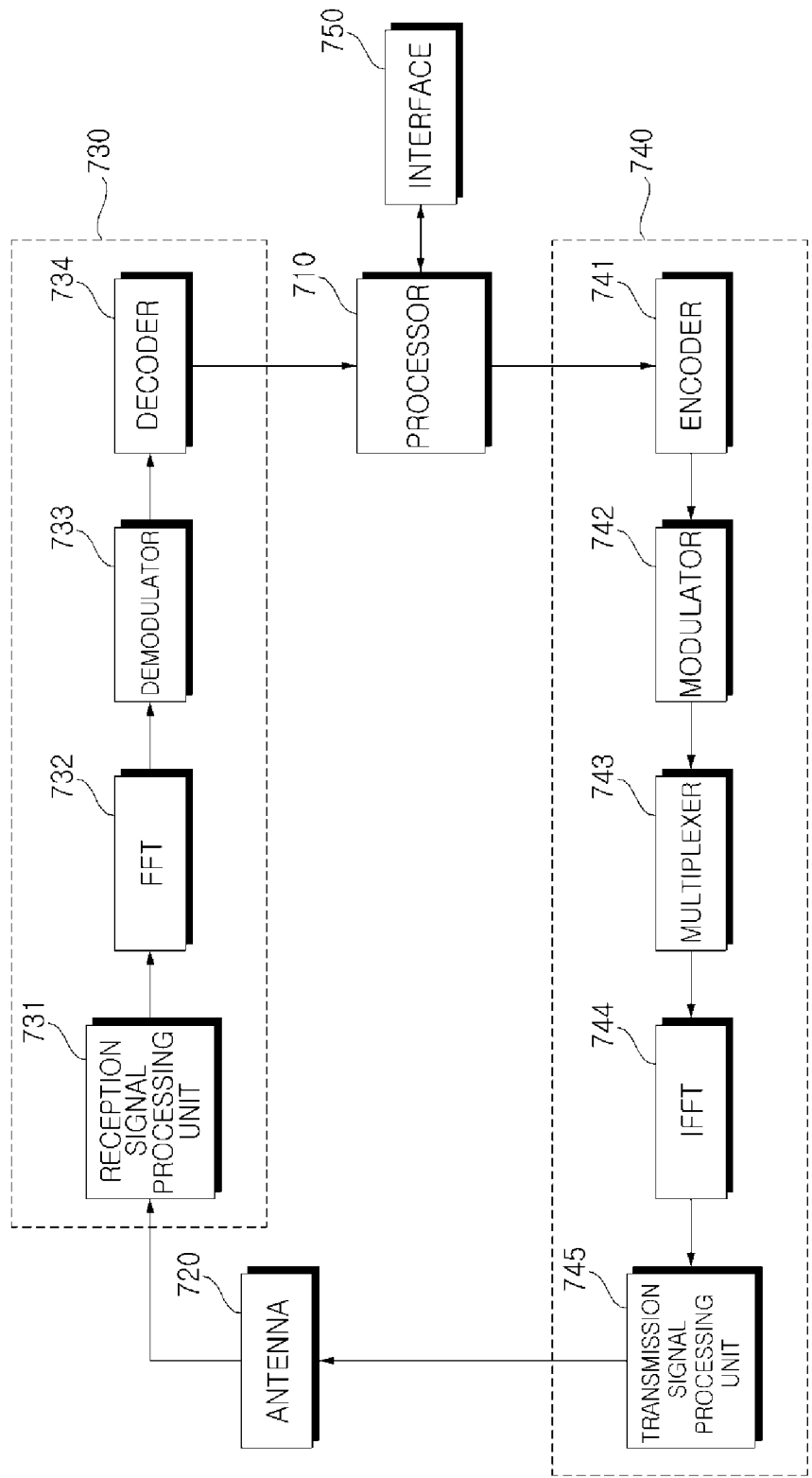
FIG. 7 is a block diagram schematically illustrating control configuration of a wireless communication module according to an embodiment of the present disclosure.

FIG. 7 is a block diagram schematically illustrating control configuration of a wireless communication module according to an embodiment of the present disclosure. The wireless communication module 120 may include an antenna 720, a transmitter 740, a receiver 730, a processor 710, and an interface 750.

The processor 710 may control overall operation of the wireless communication module 120. The processor 710 may control the transmitter 740 so that a predetermined signal is output through the antenna 720. The processor 710 may also control the receiver 730 so that a signal received through the antenna 720 is processed.

The antenna 720 may be a Printed Circuit Board (PCB) antenna with an antenna pattern formed in a PCB. The PCB antenna has high design freedom, and a constant radiation pattern which is achieved by adjusting an amount of ground source.

Meanwhile, the transmitter 740 may include an encoder 741 configured to encode a predetermined signal, and a modulator 742 configured to modulate the signal, encoded by the encoder 741, according to Orthogonal Frequency Division Multiplexing (OFDM) using multiple carriers Meanwhile, the antenna 720 may output a signal based on the signal modulated by the modulator 742.

The predetermined signal, which is a binary signal, is input to the encoder 741. The encoder 741 may encode the input signal and output encoded data streams.

The OFDM is a multi-carrier modulation technique, and advantageous in high-speed data transmission and resilient to multipath losses.

The OFDM is a multiplexing scheme that modulates hundreds of high-speed transmission signals into orthogonal narrowband subcarriers.

The OFDM is a transmission scheme that performs modulation and multiplexing together. Since a high-speed raw data stream of a single input is loaded in multi-carriers in a distributed manner, the OFDM is considered a multi-carrier modulation technology. In addition, since the transmission is carried out to multiple channels at the same time, the OFDM is considered a multiplexing technology.

The OFDM is a scheme that divides a high-rate data stream into low-rate multiple data streams and transmits the data streams at the same time, using multiple carriers.

Since there is orthogonality between the multiple carriers, frequency components of the carriers may be detected by a receiver even though the frequency components overlap each other.

The OFDM is in a structure of transmitting a high-rate data, which is susceptible to scattered subcarriers, in parallel in the form of low-rate data resilient to subcarriers. The OFDM is advantageous in selectively scheduling subcarriers.

In some implementations, the transmitter 740 may further include a multiplexer 743 configured to multiple the modulated signal. Alternatively, the transmitter 740 may further include a serial-to-parallel converter 743 configured to convert the multiplexed signals into parallel signals. Alternatively, the transmitter 740 may further include the multiplexer 743 and the serial-to-parallel converter 743.

The serial-to-parallel converter may convert a serially-input symbol stream into a parallel form. For example, a high-rate data stream may be converted by the serial-to-parallel converter into a plurality of low-rate data streams, and the plurality of data streams converted in parallel may be transmitted as being mutually orthogonal subcarriers.

The transmitter 740 may further include a transmission signal processing unit 745. The transmission signal processing unit 745 may load an OFDM modulated signal in a subcarrier through frequency transition, and transmit the OFDM modulated signal loaded in the subcarrier through the antenna 720.

Meanwhile, the receiver 730 may include: a demodulator 733 configured to demodulate a signal, received from the antenna 720, using the OFDM scheme; and a decoder 734 configured to decode the signal demodulated by the demodulator 733.

The receiver 730 may further include a reception signal processing unit 731. The reception signal processing unit 731 may extract a plurality of feature information through frequency transition of a carrier transferred from the antenna 720.

In some implementations, the receiver 730 may further include a parallel-to-serial converter, and a parallel signal converted by the parallel-to-serial converter may be transferred to the demodulator 733.

In some implementations, the transmitter 740 may further include an Inverse Fast Fourier Transform (IFFT) block 744 (or algorithm, module) configured to perform IFFT on the modulated signal, and the receiver 730 may further include a Fast Fourier Transform (FFT) block 732 (or algorithm, module) configured to perform FFT on a signal received from the antenna 720.

After being modulated, a signal may go through IFFT and be then transmitted through the antenna 720. The signal received through the antenna 720 may go through FFT and then demodulated.

Accordingly, the modulator 742 and the demodulator 733 may be implemented efficiently. In addition, the modulator 742 may perform signal processing on a frequency-selective fading channel in the frequency domain so that the signal processing is performed smoothly.

In some implementations, the wireless communication module 120 may further include a duplexer which is a switching device connecting the antenna 720 and the transmitter 740 or the receiver 730. The duplexer is a device that separate time or frequencies. The duplexer may connect the antenna 720 to the transmitter 740 or the receiver 730.

Meanwhile, the wireless communication module 120 according to an embodiment of the present disclosure may perform communication using a signal of a frequency band between 700 MHz and 900 MHz, which are frequencies having a communication rate faster than that of the existing wired communication (9.6 kbps) and enables open-space (1 km) communication in Sub 1 GHz frequencies.

More preferably, considering inter-floor communication and an antenna length, the wireless communication module 120 according to an embodiment of the present disclosure may perform communication using a signal of a frequency band of 900 MHz.

A length of the antenna 720 may be set based on a transmitting frequency or may be set based on an installation environment. For example, in the case of a ceiling mounted-type indoor unit, if an antenna length is too long, installation of the indoor unit may depend on the size of a ceiling inner space.

The smaller the transmitting frequency of the antenna 710 is, the shorter the antenna 720. Thus, a frequency needs to be set in an available frequency band in consideration of the length of the antenna 720.

Preferably, the length of an antenna may be $\lambda/2$ or $\lambda/4$ of a transmitting frequency. For example, if the transmitting frequency is 447 MHz, a wavelength is 0.67 m, and thus, the length of the antenna may be 34 cm corresponding to $\lambda/2$, or may be 17 cm corresponding to $\lambda/4$. If the transmitting frequency is 900 MHz, the length of the antenna may be approximately 17 cm corresponding to $\lambda/2$ or may be approximately 8.5 cm corresponding to $\lambda/4$. If the transmitting frequency is 2.4 GHz, a wavelength is 0.12 m, and thus, the length of the antenna may be 0.06 m corresponding to $\lambda/2$ or may be 0.03 m corresponding to $\lambda/4$.

Considering an antenna length, it is desirable to use a signal of the 2.4 GHz band. However, in the case of Wi-Fi or Bluetooth using the 2.4 GHz ISM band for a wireless network in a building, an electronic wave of 2.4 GHz is highly likely to be reflected or diffracted by obstacles, such as a floor, a window, a wall, and a partition.

In addition, since frequency use permission is not required to use the 2.4 GHz band, more and more wireless devices attempt to use the 2.4 GHz band. Hence, interference between devices is emerging as an issue.

Thus, it is more desirable that the wireless communication module 120 according to an embodiment of the present disclosure uses a frequency of 900 MHz, and the length of the antenna 720 may be $\lambda/2$ or $\lambda/4$ of the transmitting frequency of 900 MHz.

In some implementations, the antenna 720 may be installed inside a unit. For example, the antenna 720 may neither protrude nor be attached on the outside, and may be provided inside the main case of an outdoor unit or an indoor unit.

In particular, an antenna included in an indoor unit may be provided inside the main case of the indoor unit. Accordingly, the problem that an antenna protruding or attached on the outside deteriorate interior design may be avoided, and esthetic of the indoor unit may improve.

A plurality of units in the air conditioner system may transmit and receive data by wirelessly communicating with each other. According an embodiment of the present disclosure, the plurality of units may be distributed over at least two or more floors. For example, an outdoor unit may be positioned in a rooftop of a building, and an indoor unit may be positioned in a random floor inside the building. In addition, a plurality of indoor units may be distributed over multiple floors.

Accordingly, the plurality of units may be installed not on the same floor, but on multiple floors to transmit and receive data. There are obstacles, such as an inter-floor structure, a structure, a wall, and furniture, in the building, so it is necessary to use a frequency band over which a signal reaches a predetermined distance or more while penetrating an obstacle in the building.

The antenna 720 may be selectively used depending on which frequency band is used between 700 MHz and 900 MHz in Sub-GHZ bands. Depending on the frequency band in use, the shape of the antenna 720 may be changed.

The antenna 720 may transmit a signal from the transmitter 740 into the air, receive a signal of a preset frequency band in the air, and transmit the received signal to the receiver 730.

In accordance with a control command of the processor 710, the transmitter 740 and the receiver 30 may control outputting of a signal. The transmitter 740 may adjust outputting of a signal by controlling output impedance, that is, by controlling the impedance of the antenna 720 to have a preset value. The transmitter 740 and the receiver 730 may adjust an impedance in accordance with a frequency band to be transmitted and received through the antenna 720. For impedance matching, the most widely known 50Ω matching type may be used.

In some implementations, the antenna 720 may be a Multiple Input Multiple Output (MIMO) antenna, and may increase the transmission capacity by transmitting data through respective antennas.

The transmitter 740 and the receiver 730 are communication modules which support MIMO, and capable of performing multiple inputting and outputting through a plurality of antennas connected thereto. The transmitter 740 may transmit data into multiple paths through a plurality of antennas, and the receiver 730 may detect signals received through the respective paths.

The MIMO is an antenna system capable of performing spatial multiplexing, space diversity, and beam forming. Spatial multiplexing is a technology of enhancing a transmission rate by transmitting multiple information items through a plurality of transmitter antennas. Space diversity is a technology of controlling an error by transmitting the same information multiple times through a plurality of transmitter antennas. Beamforming is a technology of reducing interference by transmitting an electronic wave in a desired direction.

The wireless communication module 120 may transmit and receive signals using a plurality of antennas through MIMO, so that a plurality of units distributed in a building are allowed to communicate with each other.

The processor 710 may perform control so that data on a unit 100, which is transmitted through the interface 750, is transmitted in the form of a signal of a preset frequency band. In addition, the processor 710 may process a signal, received through the antenna 720, and transmit the processed signal to a unit. The processor 710 may control data to be converted into a form that is set according to a communication scheme in use.

The interface 750 connects the unit 100 and the wireless communication module 120. For example, the wireless communication module 120 may be connected to a controller 110 of the unit 100 through the interface 750, and may operate under the control of the controller 110.

In the case of the existing wired communication, a plurality of units is not connected one by one. Instead, the plurality of units is hierarchically connected according to a connection state of a communication line. Accordingly, since data on an indoor unit is not able to be transmitted directly to a controller or a remote control device, transmission of the data is delayed.

In addition, there is a limitation that processing loads of an outdoor unit increases and it takes a long time to transmit data depending on the number of connected indoor units. Thus, units included in the air conditioner system according to an embodiment of the present disclosure may perform wireless communication with each other.

Preferably, the units included in the air conditioner system according to an embodiment of the present disclosure may perform wireless communication with each other using a Sub-GHz frequency band.

More preferably, the units included in the air conditioner system according to an embodiment of the present disclosure may each include the wireless communication module 120 configured to perform wireless communication with other units using a Sub-GHz frequency band. The wireless communication module 120 may make it easy to manage a radiation pattern, may include a PCB antenna advantageous in securing a gain, and may employ an OFDM modulation scheme which causes less channel interference between multiple channels.

The existing 2.4 GHz and 5 GHz bands are for indoor communication in a short range approximately equal to or less than 30 m. When the 2.4 GHz and 5 GHz bands are used, a signal is not able to penetrate a thick wall or signal strength is dramatically reduced due to even a thin wall.

However, according to an embodiment of the present disclosure, if wireless communication is performed using a sub-GHZ frequency band, the wireless communication may be performed at 150 Kbps, which is 15 times or faster than which the wired communication rate of 9.6 kbps, and may be possible despite presence of an inter-floor obstacle.

In addition, not just a communication line, but also a procedure of connecting the communication line may be removed, and therefore, it is possible to reduce installation cost and time and thereby reduce the total cost.

Figure 8:
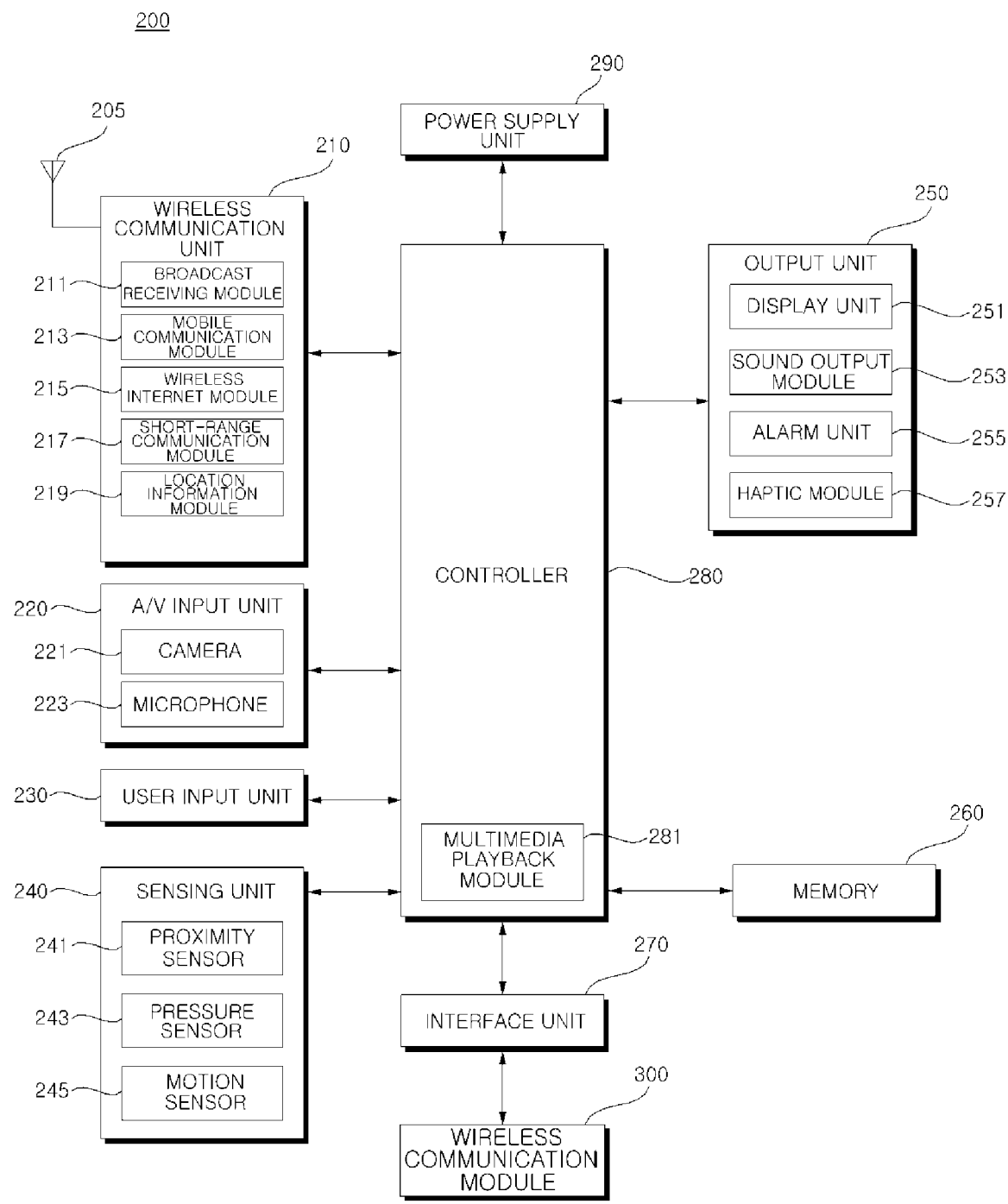
FIG. 8 is an inner block diagram illustrating a mobile terminal according to an embodiment of the present disclosure.

FIG. 8 is an inner block diagram schematically illustrating a mobile terminal according to an embodiment of the present disclosure. A mobile terminal 200 may include a wireless communication unit 210, an Audio/video (NV) input unit 220, a user input unit 230, a sensing unit 240, an output unit 250, a memory 260, an interface unit 270, a controller 280, and a power supply unit 290.

The mobile terminal 200 according to one aspect of the present disclosure may include a wireless communication module 300 configured to wirelessly communicate with a plurality of electronic devices. The wireless communication module 300 may have the same configuration as that of the above-described wireless communication module 120.

In some implementations, the wireless communication module 300 may be configured as one block of the wireless communication unit 210. In the case of wirelessly communicating with each unit 100 included in the air conditioner system using a Sub-GHz band, the wireless communication module 300 supporting wireless communication with a Sub-GHz band may be used. Not all the common mobile terminals 200 are embedded with the wireless communication module 300 supporting Sub-GHz band wireless communication, so it is desirable to use a dedicated wireless communication module 300 for connection. In this case, the wireless communication unit 300 may be connected via the interface unit 270 or via the wireless communication unit 210.

Meanwhile, the wireless communication unit 210 may include a broadcast receiving module 211, a mobile communication module 213, a wireless internet module 215, a short-range communication module 217, and a location information module 219 (e.g., a Global Position System (GPS) module).

The broadcast receiving module 211 may receive at least one of a broadcast signal or broadcast-related information from an external broadcast management server via a broadcast channel. The broadcast channel may include a satellite channel, a terrestrial channel, etc. The broadcast signal and/or the broadcast-related information received through the broadcast receiving module 211 may be stored in the memory 260.

The mobile communication module 213 may transmit and receive a radio signal with respect to at least one of a base station, an external terminal, or a server on a mobile communication network. The radio signal may include a voice call signal, a video call signal, or various types of data according to transmission and reception of text/multimedia message.

The wireless internet module 215 refers to a module for wireless Internet access. The wireless internet module 215 may be embedded in or external to the mobile terminal 200. For example, the wireless internet module 215 may perform Wi-Fi-based wireless communication or Wi-Fi Direct-based wireless communication.

The short-range communication module 217 refers to a module for local area communication, and may support short-range communication using at least one of the following: Bluetooth™, Radio Frequency Identification (RFID), Infrared Data Association (IrDA), Ultra Wideband (UWB), and ZigBee.

The short-range communication module 217 may support wireless communication between the mobile terminal 200 and a wireless communication system, wireless communication between the mobile terminal 200 and another mobile terminal 200, wireless communication between the mobile terminal and a different mobile terminal, or wireless communication between the mobile terminal 200 and a network in which an external server is located via short-range wireless area networks. Moreover, the GPS module 219 may receive position information from a plurality of GPS satellites.

Meanwhile, the wireless communication unit 210 may exchange data with a server using one or more communication modules. The wireless communication unit 210 may include an antenna 205 for wireless communication, and may include an antenna for receiving a broadcast signal in addition to an antenna for making a call.

The A/V input unit 220 is related to an audio signal or a video signal, and may include a camera 221 and a microphone 223.

The user input unit 230 generates key input data that is input by a user to control operation of the terminal. To this end, the user input unit 230 may be in the form of a key pad, a dome switch, a touch pad (static pressure/electrostatic), or the like. In particular, if a touch pad forms an inter-layered structure with a display unit 251 (or display), the structure may refer to a touch screen.

The sensing unit 240 may generate a sensing signal for controlling operation of the mobile terminal 200, by sensing the current state of the mobile terminal 200, for example, an opened/closed state of the mobile terminal 200, a position of the mobile terminal 200, and the presence of the user's contact.

The sensing unit 240 may include a proximity sensor 241, a pressure sensor 243, a motion sensor 245, etc. The motion sensor 245 may sense movement or a position of the mobile terminal 200 using an accelerometer, a gyro sensor, a gravity sensor, and the like. In particular, the gyro sensor is a sensor for measuring an angular velocity, which is able to sense a direction (an angle) of rotation against a reference direction.

The output unit 250 may include the display unit 251, a sound output module 253, an alarm unit 255, a haptic module 257, etc. The display unit 251 displays information processed in the mobile terminal 200.

Meanwhile, when the display unit 251 forms an inter-layered structure with the touch pad to implement a touch screen, the display unit 251 may be used not just as an output device but also as an input device to which information is allowed to be input by a user's touch.

The sound output module 253 outputs audio data received from the wireless communication unit 210 or stored in the memory 260. The sound output module 253 may include a speaker, a buzzer, etc.

The alarm unit 255 outputs a signal for notifying occurrence of an event in the mobile terminal 200. For example, the alarm unit 255 may output a signal in the form of vibration.

The haptic module 257 generates various tactile effects that a user can feel. The typical example of a tactile effect generated by the haptic module 257 may be vibration effect.

The memory 260 may store a program for processing and controlling of the controller 280 or may temporarily store input and output data (e.g., a phone book, messages, still images, videos, etc.).

The interface unit 270 may plays a role as a channel with all external devices connected to the mobile terminal 200. The interface unit 270 receives data or power from an external device and transfers the received data or power to each element of the mobile terminal 200 or allow internal data of the mobile terminal 200 to be transmitted to an external device.

The controller 280 generally controls overall operation of the mobile terminal 200 by controlling operation of each of the aforementioned elements. For example, the controller 280 may perform control or processing related to a voice call, data communication, a video call, and the like. In addition, the controller 280 may be provided with a multimedia playback module 281 for playing multimedia. The multimedia playback module 281 may be implemented in a hardware form inside the controller 280, or may be implemented in a software form separately from the controller 280.

The power supply unit 290 receives external and internal power under a control of the central controller 280 and supplies power necessary for operating each element.

Meanwhile, the mobile terminal 200 shown in FIG. 8 is a block diagram illustrating an embodiment of the present disclosure. Depending on specifications of the mobile terminal 200 in actual implementation, each constituent element in the block diagram may be combined or omitted or a new element may be added.

That is, two or more components may be combined into one element or one component may be divided into two or more components, as needed. In addition, the function of each block is described for the purpose of describing the embodiment of the present disclosure and thus specific operations or devices should not be construed as limiting the scope and spirit of the present disclosure.

FIGS. 9 to 17 are diagrams for explaining configuration and operation of an air conditioner system according to an embodiment of the present disclosure.

Figure 9:
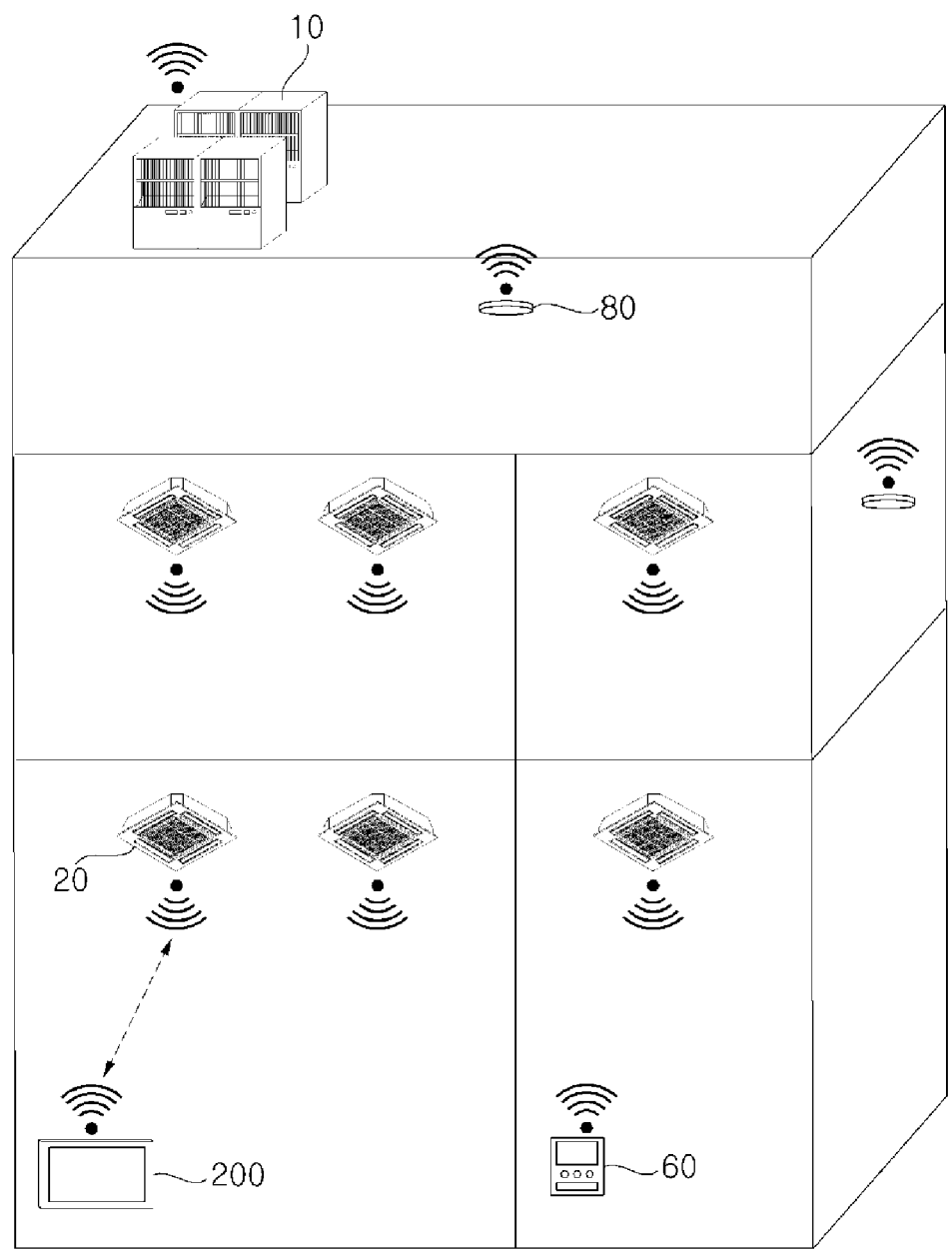

Referring to FIG. 9, the air conditioner system according to the present disclosure may include an indoor unit 20, an outdoor unit 10, a remote controller 60, a wireless sensor 80, and a mobile terminal 200. In addition, the air conditioner system may further include a controller, a ventilator, a defrost, a humidifier, a heater, or the like.

The remote controller 60 may be connected to the indoor unit 20 or the outdoor unit 10 in a wired manner, and, more preferably, the remote controller 60 may communicate with the indoor unit 20 or the outdoor unit 10 in a wireless manner.

As described above with reference to FIGS. 1 to 8, the mobile terminal 200 and the controller 50 (see FIG. 1) may be wirelessly connected to units, such as the indoor unit 20 and the outdoor unit 10, and may control each of the units.

In response to a request for data information (or data) from the mobile terminal 200 or the controller 50, the indoor unit 20 and the outdoor unit 10 may transmit the requested data information. Depending on content of a request from the mobile terminal 200 or the controller 50, the indoor unit 20 and the outdoor unit 10 may transmit data information with different content.

The indoor unit 20 and the outdoor unit 10 may receive a control signal from the mobile terminal 200 and the controller 50. When receiving a control signal from the mobile terminal 200 or the controller 50, the indoor unit 20 and the outdoor unit 10 may report reception of the control signal to the mobile terminal 200 or the controller 50, but aspects of the present disclosure are not limited thereto and the above process may vary depending on a communication method adapted by the air conditioner system.

When receiving a control signal, the indoor unit 20 and the outdoor unit 10 may perform an operation corresponding to the control signal. The indoor unit 20 and the outdoor unit 10 may receive, from the mobile terminal 200 or the controller 50, a storage cycle or a storage time for storing a data signal including an operation state. The indoor unit 20 and the outdoor unit 10 may store data information periodically or in response to occurrence of an error.

When an error occurs, the indoor unit 20 and the outdoor unit 10 may extend a storage time of the recently stored data information. Each of the indoor unit 20 and the outdoor unit 10 may include a storage medium for storing the data information. For example, the indoor unit 20 and the outdoor unit 10 may periodically receive data information and may store, in response to occurrence of an error, the recently stored data information distinguishably from other information, but aspects of the present disclosure are not limited thereto.

Data information may include an operation state of the indoor unit 20 or the outdoor unit 10. For example, the data information may include air temperature, compression temperature, evaporation temperature, discharge temperature, heat-exchanger temperature, etc., but aspects of the present disclosure are not limited thereto and the data information may include a broad range of information related to operation of the indoor unit 20 or the outdoor unit 10.

The indoor unit 20 or the outdoor unit 10 may transmit data information including an operation state to the mobile terminal 200 or the controller 50. When an on/off state or an operation state of the indoor unit 20 or the outdoor unit 10 is changed or when an error occurs, the indoor unit 20 or the outdoor unit 10 may transmit corresponding data information to the mobile terminal 200 or the controller 50. The indoor unit 20 or the outdoor unit 10 may communicate with the mobile terminal 200 or the controller 50 in a predetermined period of in response to occurrence of an event.

The mobile terminal 200 or the controller 50 may receive in real time detailed cycle data, which allows error analysis of each unit, and displays the received data on a screen.

In the case where the mobile terminal 200 or the controller 50 displays data information in a test form such as numbers, data information of the indoor unit 20, data information of the outdoor unit 10, and valve information of a pipe connecting the indoor unit 20 and the outdoor unit 10 may be displayed.

In some implementations, when displaying the valve information, the mobile terminal 200 or the controller 50 may display opening or closing of a valve in the form of color or picture. For example, the mobile terminal 200 or the controller 50 may display an opened valve in blue and a closed valve in gray or may display a picture of an opened valve and a picture of a closed valve, but aspects of the present disclosure are not limited to the aforementioned color or types of pictures.

In the case of displaying data information in the form of a time series image, the mobile terminal 200 or the controller 50 may select an outdoor unit 10 or an indoor unit 20 to display.

In the case of selecting one outdoor unit 10 from among a plurality of outdoor units 10, the mobile terminal 200 or the controller 50 may select an indoor unit 20 to check, from among a plurality of indoor units 20 connected to the selected outdoor unit 10.

When the outdoor unit 10 and the indoor unit 20 are selected, the mobile terminal 200 or the controller 50 may receive data information, which includes an operation state of the selected indoor unit 20 and a connection state between the selected outdoor unit 10 and the selected indoor unit 20. The connection state may include a connection state of a pipe, a flow inside the pipe, an on/off state of the valve, etc., but aspects of the present disclosure are not limited thereto.

The mobile terminal 200 or the controller 50 may display an operation state of the selected outdoor unit 10 and the selected indoor unit 20 in a time-series manner in the form of change of a picture or change of color. The mobile terminal 200 or the controller 50 may display a state of a pipe connecting the selected outdoor unit 10 and the selected indoor unit 20, and a state of a valve.

The mobile terminal 200 or the controller 50 may check in real time an operation state of the indoor unit 20 or the outdoor unit 10. When checking the operation state of the indoor unit 20 or the outdoor unit 10 in real time, the mobile terminal 200 or the controller 50 may receive data information in real time and display received data information.

The wireless sensor 80 senses an air condition, and may transmit air condition data corresponding to the sensed air condition. The air condition may be a concept including at least one of temperature, humidity, pressure, an amount of dust, an amount of carbon dioxide, or an amount of oxygen. Accordingly, the wireless sensor 80 may measure at least one of temperature, humidity, pressure, an amount of dust, an amount of carbon dioxide, an amount of oxygen, or the like.

The air condition data may include data on at least one of temperature, humidity, pressure, an amount of dust, an amount of carbon dioxide, an amount of oxygen, or the like.

The wireless sensor 80 may transmit the air condition data in a broadcast manner. The broadcast manner may be a method of transmitting data without specifying a recipient. By transmitting air condition data to a predetermined communication network without specifying a recipient, the wireless sensor 80 may save energy, operations, and components necessary to set a recipient of the data.

The air condition data broadcasted by the wireless sensor 80 may be transferred to the outdoor unit 10 or the indoor unit 20. In addition, the air condition data broadcasted by the wireless sensor 80 may be transferred to the controller 50 or the mobile terminal 200.

In some implementations, the wireless sensor 80 may also include the above-described wireless communication module 120. The wireless sensor 80 may include the wireless communication module 120 to transmit sensing data to at least one unit from among a plurality of units.

Alternatively, at least one wireless sensor, which transmits sensing data to at least one unit from among the plurality of units, may include: an encoder configured to encode a predetermined signal; a modulator configured to modulate the encoded signal according to OFDM using multiple subcarriers; and one or more antennas each having an antenna pattern formed in a PCB and configured to transmit a signal based on the modulated signal.

That is, the wireless sensor 80 according to an embodiment of the present disclosure may include components of the wireless communication module 120, except the receiver 730, thereby enabled to transmit sensing data.

The indoor unit 20 or the outdoor unit 10 may perform an appropriate air conditioning operation based on the received air condition data. The indoor unit 20 or the outdoor unit 10 may operate in accordance with a control signal received from the controller 50 or the mobile terminal 200.

As shown in FIG. 9, when units are wirelessly connected in the air conditioner system, installation costs and time may be remarkably reduced, compared to when the units are connected in a wired manner.

In addition, it is possible to check information of any one unit and control the corresponding unit by communicating directly the corresponding unit to control without passing through a particular unit, such as the controller 50. As a result, it is advantageous in terms of communication time and convenience of use.

Units included in the air conditioner system according to an embodiment of the present disclosure may each include the wireless communication module 120 configured to perform wireless communication with other units using a Sub-GHz frequency band. The wireless communication module 120 may make it easy to manage a radiation pattern, may include a PCB antenna advantageous in securing a gain, and may employ an OFDM modulation scheme which causes less channel interference between multiple channels.

Accordingly, in a general installation environment of the air conditioner system in which an outdoor is installed at a basement or a rooftop of a building and units are distributed between obstacles, such as floors and walls, the units may be able to smoothly perform wireless communication with each other.

Figure 10:
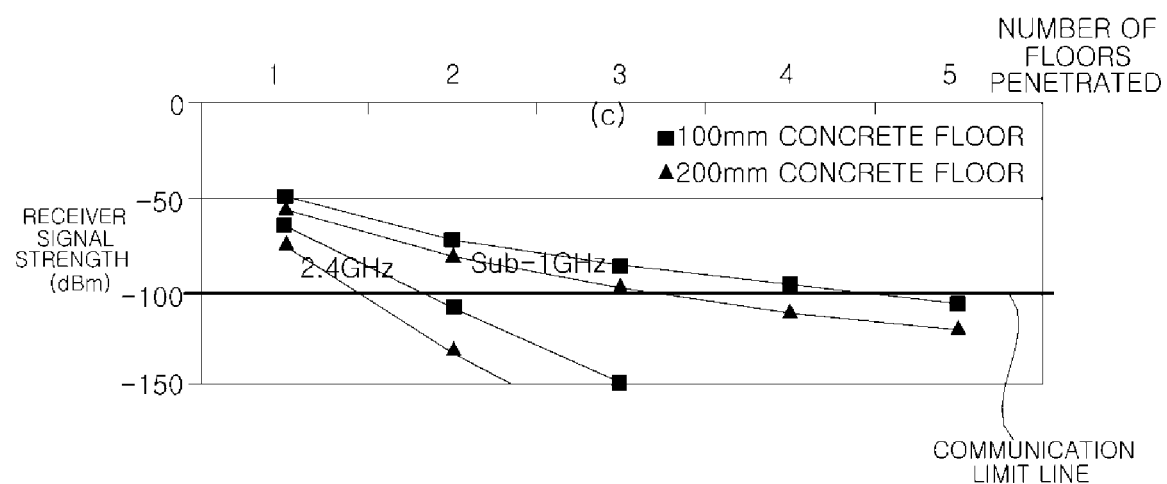

FIG. 10 is a diagram illustrating a result of experiment about a propagation characteristic of each frequency depending on a medium in a building. More specifically, it is an experiment about a propagation characteristic of the Sub-1 GHz frequency band and the 2.4 GHz frequency band, such as Wi-Fi and Zigbee, in a building with 100 mm concrete floors and a building with 200 mm concrete floors.

Referring to FIG. 10, when it comes to penetrating one floor, a propagation characteristic of the sub-1 GHz frequency band is superior to that of the 2.4 GHz frequency band.

In addition, when it comes to penetrating two floors, the sub-1 GHz frequency band enables communication, but the 2.4 GHz frequency band fails to enable communication. Thus, the 2.4 GHz frequency band is capable of penetrating only one floor, and thus, it may not be suitable for the installation environment of the air conditioner system.

On the contrary, the Sub-1 GHz frequency band is able to enable communication by passing through up to four floors, and thus, it is suitable for inter-floor communication and the installation environment of the air conditioner system. Since it is desirable to perform wireless communication using the Sub-1 GHz frequency band, the air conditioner system according to an embodiment of the present disclosure may perform wireless communication using the Sub-1 GHz frequency band.

Figure 11:
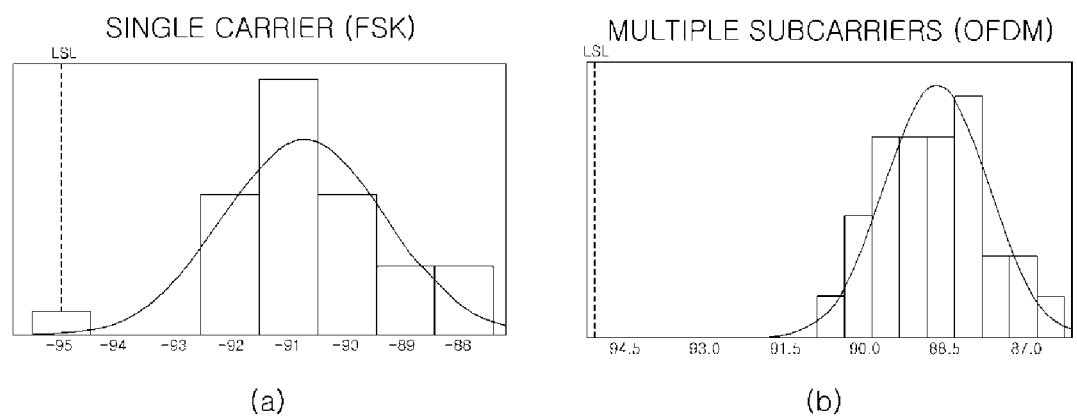

FIG. 11 is a diagram illustrating a result of experiment of comparing receiver signal strength between a Frequency Shift Keying (FSK) scheme using a single carrier and an OFDM scheme using multiple subcarriers in the same space. In the same space, the OFDM scheme using multiple subcarriers exhibits better effects in improving distributed signal strength at a receiver, compared to the FSK scheme using a single carrier.

The OFDM scheme using multiple subcarriers is resilient to inter-floor/wall multipath losses, and convenient for inter-floor communication. Thus, the air conditioner system according to an embodiment of the present disclosure may perform modulation and demodulation according to the OFDM scheme.

FIG. 12 is a diagram illustrating a result of experiment of comparing a communication success rate between types of antenna. In the case of a pole antenna with a deviation of radiation in directions, a communication success rate remarkably drops in a direction between 90° and 270°.

On the contrary, the PCB antenna exhibits a high success rate in any direction. Thus, the air conditioner system according to an embodiment of the present disclosure may use a PCB-type antenna.

The smaller the transmitting frequency of an antenna is, the shorter the antenna 720 is. Thus, a frequency needs to be set in an available frequency band in consideration of the length of the antenna.

In addition, it is necessary to use an antenna with a length optimized for its transmitting frequency. Preferably, the length of an antenna may be $\lambda/2$ or $\lambda/4$ of its transmitting frequency. For example, in the case where a transmitting frequency is 900 MHz, the length of an antenna may be 17 cm corresponding to $\lambda/2$ or may be 8.5 corresponding to $\lambda/4$.

In a distance of 300 m, a communication success rate is compared between an antenna with a length of $\lambda/4$ (about 8.5 cm) and an antenna with a length of 10 cm. In this case, when the antenna length is $\lambda/4$ (about 8.5 cm), the communication rate is about 99.9%. When the antenna length is 10 cm, the communication success rate is about 96.3%.

Thus, the air conditioner system according to an embodiment of the present disclosure may use a sub GHz frequency band and an antenna with a length corresponding to $\lambda/2$ or $\lambda/4$.

More preferably, the air conditioner system according to an embodiment of the present disclosure may use a frequency of 900 MHz and use an antenna with a length corresponding to $\lambda/2$ or $\lambda/4$ of the transmitting frequency.

FIG. 13 is a diagram illustrating a result of experiment of measuring a communication success rate in an outdoor area and a building by a variety of modulation schemes when a Sub-GHz frequency and a PCB antenna are used. For impedance matching, 50Ω matching type is equally used.

The modulation schemes used for the experiment are Binary Frequency-Shift Keying (2FSK), Binary Gaussian frequency-shift keying (2GFSK), Filtered 2FSK, Offset Quadrature Phase Shift Keying (OQPSK), and OFDM.

In FIG. 13, a communication success rate of an outdoor area indicates a distance within which communication is succeeded, and a communication success rate of a building indicates an average of the number of floors which allows communication to be succeeded in a 3636 m² building A and a 1322 m² building B.

Meanwhile, an obstacle success deviation indicates a success rate deviation in a situation where a heavy truck is passing through a transmitter and a receiver. Referring to FIG. 13, OFDM is excellent even in terms of speed.

In addition, the OFDM shows the longest success length of 800 m in an outdoor area, and passes through at least one more floor of a building to thereby make communication enabled.

That is, even by using FSK with 900 MHz, a further distance may be secured in the outdoor area. However, to check communication reliability suitable for diverse indoor conditions and an indoor communication distance, it is desirable to apply OFDM and a PCB-type antenna.

Thus, units included in the air conditioner system according to an embodiment of the present disclosure may each include a wireless communication module 120 configured to perform wireless communication using a Sub-GHz frequency band. The wireless communication module 120 may make it easy to manage a radiation pattern, may include a PCB antenna advantageous in securing a gain, and may employ an OFDM modulation scheme which causes less channel interference between multiple channels.

Figure 14:
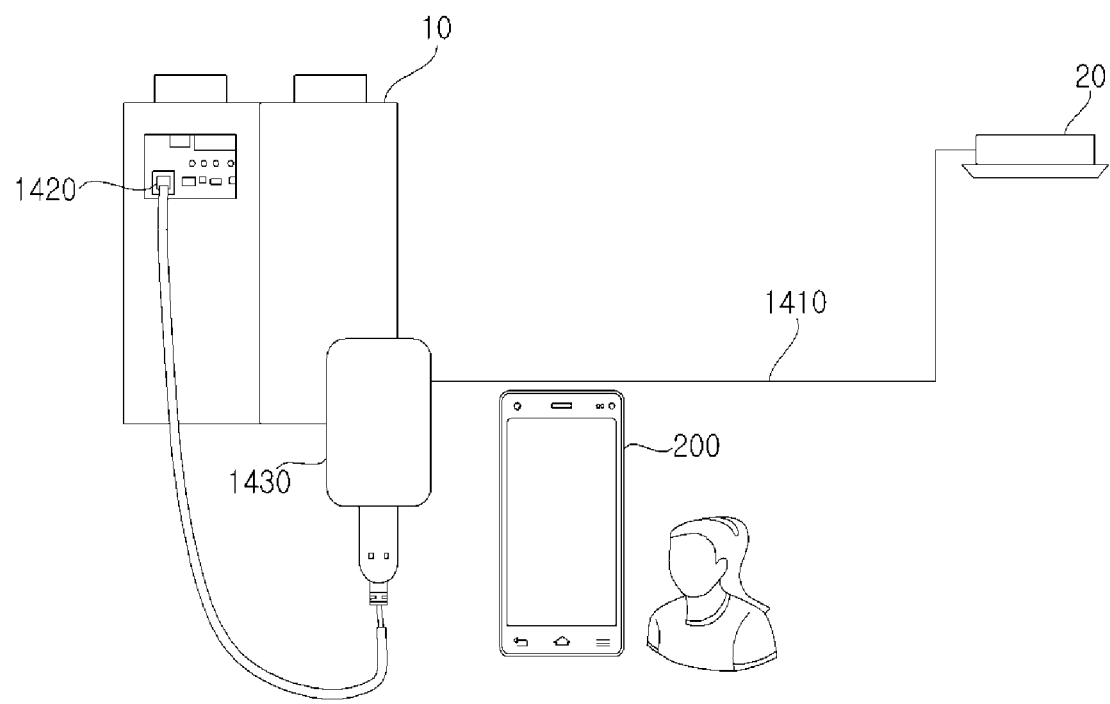
Figure 15:
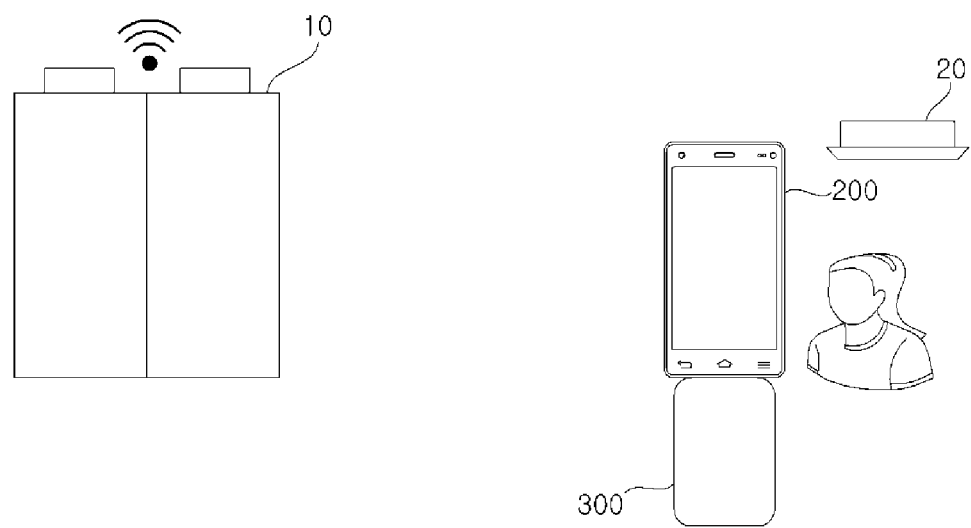

FIG. 14 is a diagram illustrating an example of monitoring and controlling a state of an air conditioner system, which is connected in a wired manner, using a mobile terminal. FIG. 15 is a diagram illustrating an example of monitoring and controlling a state of an air conditioner system using a mobile terminal.

Referring to FIG. 14, a plurality of units 10 and 20 is connected via a communication line 1410. For example, the plurality of indoor units 30 may be connected to one outdoor unit 10 via the communication line 1410.

When states of units are monitored through the mobile terminal 200, data on the indoor unit 20 may not be transmitted directly to the mobile terminal 200 but may be transmitted to the mobile terminal 200 via the outdoor unit 10.

Thus, the mobile terminal 200 is not able to freely communicate with each unit of the air conditioner system, and needs to receive, from a particular unit, only information on the corresponding particular unit.

In addition, since wired communication and wireless communication, such as Wi-Fi, are different, even the outdoor unit 10 embedded with a wired communication module for communication with the indoor units 20 is capable of communicating with the mobile terminal 200 only when an additional Wi-Fi module is embedded.

Alternatively, as shown in FIG. 14, a Wi-Fi module 1430 may be connected to a connection port 1420 of the outdoor unit 10 to thereby communicate with the mobile terminal 200. In this case, in order to connect the Wi-Fi module 1430, a manager or an operator needs to physically move to a place where the outdoor unit 10 is located, such as a rooftop.

In addition, in order to allow connection of the Wi-Fi module 1430, an opening may be provided on a part of the outdoor unit 10. But, if left opened, this opening may mislead a user to think that a problem exists in the unit or repair is needed, so the user's confidence in reliability of the product may be degraded.

Alternatively, a cover may be provided over the opening. An operator may disassemble the cover of an outdoor/indoor unit and then make connection for communication to a monitoring device such as the mobile terminal 200. However, even such method of enabling monitoring may not be desirable to the user, since it may be inconvenient to the user as well as be a potential source of damage to the unit when accessing the unit in this manner.

On the contrary, according to the present disclosure, it is possible to monitor an operation cycle and check error information even without disassembling an indoor unit/outdoor unit.

Referring to FIG. 15, the outdoor unit 10 and the indoor units 20 according to an embodiment of the present disclosure may communicate with each other using a Sub-GHz frequency, a PCB antenna, and OFDM. To this end, the outdoor unit 10 and the indoor units 20 may each include the wireless communication module 120 which uses a Sub-GHz frequency, a PCB antenna, and the OFDM.

In addition, the mobile terminal 200 may be embedded with a wireless communication module 300 identical to the above-described wireless communication module 120, or may be connected to a wireless communication module identical to the above-described wireless communication module 120 to communicate with the outdoor unit 10 using a Sub-GHz frequency.

Accordingly, inter-floor communication is enabled through multiple floors, and therefore, a manager or an operator does not need to move to a rooftop.

In addition, the manager or the operator is able to monitors an operation cycle of the air conditioner system and check signal strength and a communication state in any desired place, so a unit erroneous state may be confirmed without need of disassembling the unit.

In addition, the mobile terminal 200 is able to communicate directly with the indoor units 20 without passing through the outdoor unit 10.

In addition, the mobile terminal 200 may be provided with an application for controlling the air conditioner system, and monitor and control a state of the air conditioner system by executing the application.

Meanwhile, in the existing technique using wired communication, time for installation of a communication line and wire connection time accounts for about 13% of the total installation time. Therefore, material cost, labor cost, installation cost, and installation time have increased.

In addition, when the existing technique using wired communication is used, wrong wire connection keeps taking place consistently.

Figure 16:
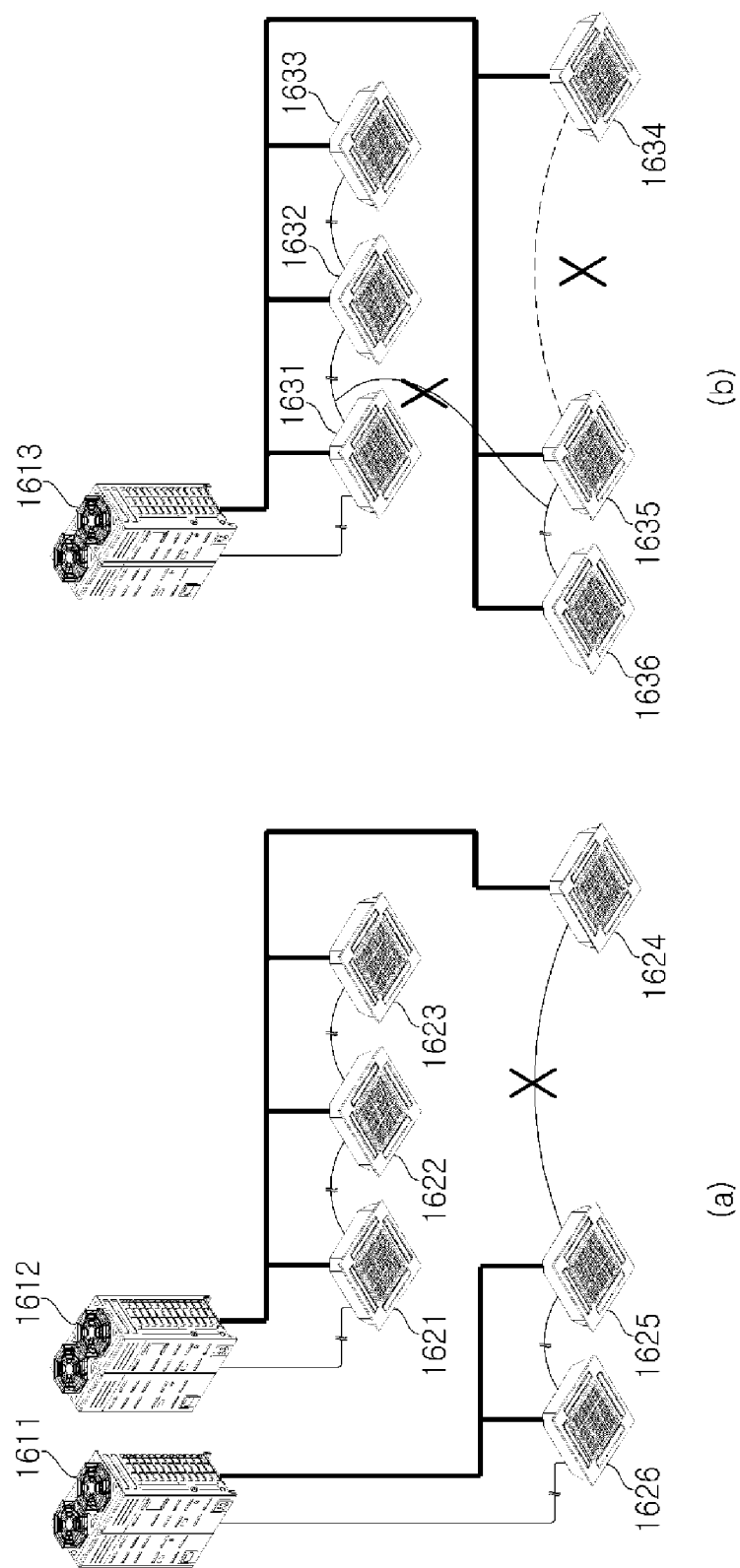

FIG. 16 is a typical example of wrong wire connection. Referring to (a) of FIG. 16, a first outdoor unit 1611 is connected to a plurality of indoor units 1625 and 1626 via a refrigerant pipe, and a second outdoor unit 1612 is connected to a plurality of indoor units 1621, 1622, 1623, and 1624.

In this case, the first outdoor unit 1611 is set as one group with the indoor units 1625 and 1626 connected thereto via a refrigerant pipe, and needs to be connected to the indoor units 1625 and 1626 sequentially via a communication line.

In addition, the second outdoor unit 1612 is set as one group with the indoor units 1621, 1622, 1623, and 1624 connected thereto via a refrigerant pipe, and needs to be connected to the indoor units 1621, 1622, 1623, and 1624 sequentially via a communication line.

Referring to (a) of FIG. 16, cross wire connection may takes place, which indicates that an indoor unit 1624 supposed to be connected to another indoor unit 1623 of the second outdoor unit 1612 is connected to the indoor unit 1625 belonging to a different group.

Referring to (b) of FIG. 16, a third outdoor unit 1613 is connected to a plurality of indoor units 1631, 1632, 1633, 1634, 1635, and 1636 via a refrigerant pipe.

In this case, the indoor units 1631, 1632, 1633, 1634, 1635, and 1636 connected to the third outdoor unit 1613 via a refrigerant pipe need to be sequentially connected to the third outdoor unit 1613 via a communication line.

Referring to (b) of FIG. 16, non wire connection and Y wire connection may take place. The non wire connection indicates that a particular indoor unit 1634 is missed out from connection via a communication line, and the Y wire connection indicates that a particular indoor unit 1631 is not connected to an indoor unit 1632 supposed to be connected thereto, but connected to other indoor units 1635 and 1636.

In addition, there may be wrong wire connection of a connector between a power line and a communication line. As such, if wrong wire connection takes place, an error may occur even in analysis of communication error and monitoring of an operation cycle, and this may lead to inconvenience after purchase of a product.

Figure 17:
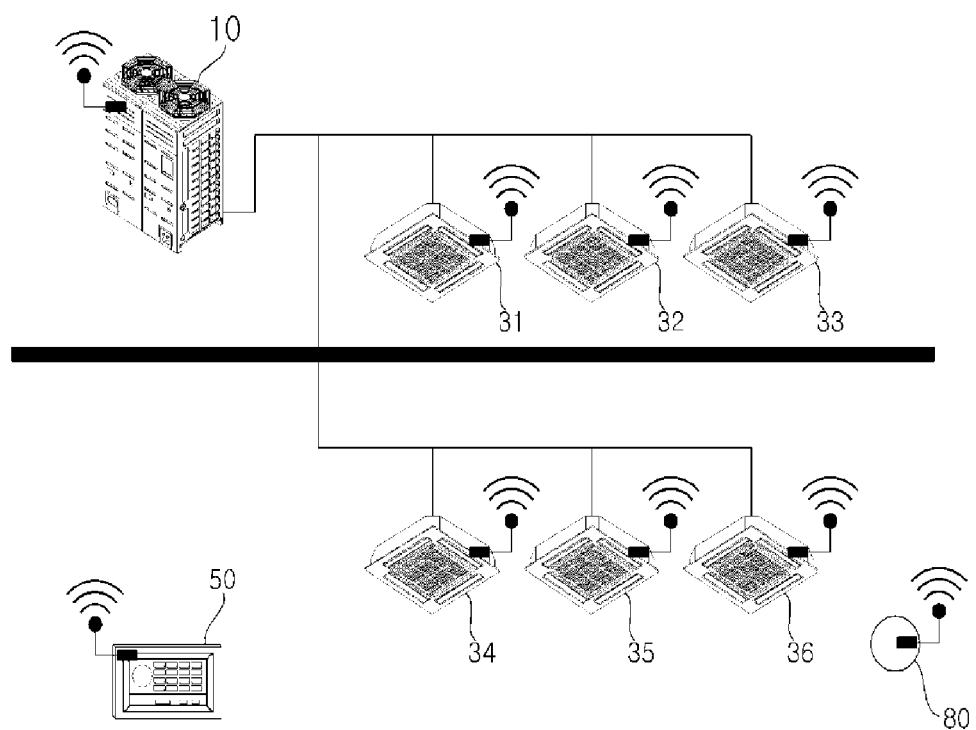

The air conditioner system according to an embodiment of the present disclosure may include a plurality of units. Referring to FIG. 17, the air conditioner system according to an embodiment of the present disclosure may include at least one outdoor unit 10, and a plurality of indoor units 31, 32, 33, 34, 35, and 36 connected to the outdoor unit 10 via a refrigerant pipe. In addition, the air conditioner system according to an embodiment of the present disclosure may further include a controller 50 and a wireless sensor 80.

Meanwhile, the outdoor unit 10 and the plurality of indoor units 31, 32, 33, 34, 35, and 36 connected to the outdoor unit 10 via a refrigerant may be set as one group and controlled as a group. In addition, the outdoor unit 10 and the plurality of indoor units 31, 32, 33, 34, 35, and 36 may use a different communication channel.

The units 10, 31, 32, 33, 34, 35, 36, 50, and 80 included in the air conditioner system according to an embodiment of the present disclosure may include a wireless communication module 120 which performs wireless communication using a Sub-GHz frequency.

The wireless communication module 120 may perform wireless communication using a PCB antenna and OFDM. That is, according to an embodiment of the present disclosure, the units are able to perform wireless communication with each other using OFDM Accordingly, the units are able to perform wireless communication with each other smoothly despite a structural obstacle, such as a floor and a wall.

Meanwhile, in the existing technique using wired communication, different-layer communication protocols are used between a controller and an outdoor unit, between indoor unit and an outdoor unit, and between an indoor unit and a remote controller.

However, according to an embodiment of the present disclosure, each unit is able to freely communicate with any other unit using the same wireless communication protocol.

In addition, it is possible to remove a communication line, prevent a possibility of occurrence of wrong wire connection from the beginning, and increase installation freedom of the controller 50.

Accordingly, it is possible to prevent damage to the interior design when an error occurs in a communication line, for example, disconnection, and also to avoid initial installation error, the need of analyzing communication error, and challenges of service.

In addition, in the case of an existing 485 communication, if a GND short occurs in a 485 communication modem, it can be solved by shutting down the whole systems and then separating and connecting the modem.

However, according to an embodiment of the present disclosure, a defective components may be found in a wireless communication module include in each unit and replaced. Accordingly, the whole system does not need to be shut down just because of a single system error.

In addition, according to at least one embodiment of the present disclosure, it is possible to create a high-quality wireless communication environment.

In addition, according to at least one embodiment of the present disclosure, it is possible to provide an air conditioner system, which allows units to wirelessly communicate directly with each other regardless of an installation environment, and a control method of the system.

According to at least one embodiment of the present disclosure, an installation process is easy and costs for installation and administration may be reduced because an additional communication line is not required.

According to at least one embodiment of the present disclosure, it is possible to monitor and control units in a wireless communication environment.

In addition, according to at least one embodiment of the present disclosure, it is possible to quickly and easily set and control a group of units.

An electronic device (unit), a wireless communication module, a remote control device, and an air conditioner system according to the present disclosure are not limitedly applicable to the configurations and methods of the embodiments as described above. For example, all or some of the embodiments may be selectively combined to achieve various modifications.

Meanwhile, a control method of the electronic device (unit), the wireless communication module, the remote control device, and the air conditioner system according to the present disclosure may be implemented as code that can be written on a computer-readable medium in which a program is recorded and thus read by a computer. The computer-readable medium includes all kinds of recording devices in which data is stored in a computer-readable manner. Examples of the computer-readable recording medium may include a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). Furthermore, the recording medium readable by a processor may be distributed over computer systems connected over a network, and the code readable by a processor may be stored and executed in a distributed manner.

The present disclosure provides an air conditioner system capable of implementing a high-quality wireless communication environment.

The present disclosure provides an air conditioner system in which each unit is capable of wirelessly communicating with one another, regardless an installation environment.

The present disclosure provides an air conditioner system capable of monitoring and controlling units in an wireless communication environment.

In one general aspect of the present disclosure, the above and other objects can be accomplished by the provision of an air conditioner system which comprises a plurality of units comprising at least one outdoor unit and a plurality of indoor units, wherein the plurality of units comprises a wireless communication module configured to perform wireless communication using a Sub-GHz frequency band between the plurality of units, wherein the wireless communication module includes: an encoder configured to encode a predetermined signal; a modulator configured to modulate the encoded signal according to Orthogonal Frequency Division Multiplexing (OFDM) using multiple subcarriers; at least one antenna having an antenna pattern formed in a Printed Circuit Board (PCB), and configured to output a signal based on the modulated signal; a demodulator configured to demodulate a signal, received from the at least one antenna, according to the OFDM; and a decoder configured to decode the demodulated signal. Accordingly, a high-quality wireless communication environment may be implemented.

According to at least one embodiment of the present disclosure, it is possible to realize a high-quality wireless communication environment.

In addition, according to at least one embodiment of the present disclosure, an air conditioner system in which each unit is able to wirelessly communicate with one another regardless of an installation environment, and a control method thereof may be provided.

In addition, according to at least one embodiment of the present disclosure, an installation process is easy and costs for installation and administration may be reduced because an additional communication line is not required.

In addition, according to at least one embodiment of the present disclosure, it is possible to monitor and control units in a wireless communication environment.

In addition, according to at least one embodiment of the present disclosure, it is possible to quickly and easily set and control a group of units.

Meanwhile, other effects may be explicitly or implicitly disclosed in the description of the embodiments of the present disclosure.

While the disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner system comprising:
a plurality of units corresponding to each of at least one outdoor unit and a plurality of indoor units,
wherein each of the plurality of units comprises a wireless communication module and being fixedly located in a plurality of spaces separated from each other, the wireless communication module being configured to perform wireless communication between the plurality of units using a Sub-GHz frequency band,
wherein the wireless communication module includes:
an encoder configured to encode a predetermined signal,
a modulator configured to modulate the encoded signal according to Orthogonal Frequency Division Multiplexing (OFDM) using multiple subcarriers,
at least one antenna having an antenna pattern formed on a Printed Circuit Board (PCB), and configured to output a signal based on the modulated signal,
a demodulator configured to demodulate a signal received at the at least one antenna, according to the OFDM, and
a decoder configured to decode the demodulated signal,
wherein a first unit among the plurality of units is configured to:
communicate using a first wireless communication method through the wireless communication module when communicating with a second unit disposed in a first space, and
communicate using a second wireless communication method different from the first wireless communication method through the wireless communication module when communicating with a third unit disposed in a second space different from the first space,
wherein the first wireless communication method is a wireless communication method using a channel of a first frequency band corresponding to the second unit in the Sub-GHz frequency band,
wherein the second wireless communication method is a wireless communication method using a channel of a second frequency band corresponding to the third unit in the Sub-GHz frequency band, the second frequency band being different from the first frequency band.

2. The air conditioner system of claim 1, wherein the wireless communication module further includes
a multiplexer configured to multiplex the modulated signal, and a serial-to-parallel converter configured to convert the multiplexed serial signal into a parallel signal.

3. The air conditioner system of claim 1, wherein the wireless communication module further includes
a Fast Fourier Transform (FFT) module configured to perform FFT on a signal received from the at least one antenna, and
an Inverse Fast Fourier Transform (IFFT) module configured to perform IFFT on the modulated signal.

4. The air conditioner system of claim 1, wherein the wireless communication module performs communication using a signal of a frequency band between 700 MHz and 900 MHz.

5. The air conditioner system of claim 4, wherein the wireless communication module performs communication using a signal of 900 MHz.

6. The air conditioner system of claim 1, wherein the at least one antenna is installed inside a body of a corresponding one of the plurality of units.

7. The air conditioner system of claim 1, wherein the plurality of units each have a body, and the at least one antenna does not protrude from the body.

8. The air conditioner system of claim 1, wherein the at least one antenna is a Multiple Input Multiple Output (MIMO) antenna.

9. The air conditioner system of claim 1, wherein a length of the at least one antenna is $\lambda/2$ or $\lambda/4$ of a transmitting frequency.

10. The air conditioner system of claim 1, wherein a transmitting frequency is 447 MHz and a length of the at least one antenna corresponds to 34 cm for $\lambda/2$ or 17 cm for $\lambda/4$.

11. The air conditioner system of claim 1, wherein a transmitting frequency is 900 MHZ and a length of the at least one antenna corresponds to 17 cm for $\lambda/2$ or 8.5 cm for $\lambda/4$.

12. The air conditioner system of claim 1, further comprising a remote control device which includes the wireless communication module to monitor the plurality of units.

13. The air conditioner system of claim 12, wherein the remote control device is one of a controller configured to control the plurality of units, a wired remote controller, a wireless remote controller, and a mobile terminal.

14. The air conditioner system of claim 1, further comprising at least one wireless sensor that includes the wireless communication module to transmit sensing data to at least one unit from among the plurality of units.

15. The air conditioner system of claim 1, further comprising at least one wireless sensor configured to transmit sensing data to at least one unit from among the plurality of units,
wherein the wireless sensor includes
an encoder configured to encode a predetermined signal,
a modulator configured to modulate the encoded signal according to OFDM using multiple subcarriers, and
at least one antenna having an antenna pattern formed in a PCB, and configured to output a signal based on the modulated signal.

16. The air conditioner system of claim 1, wherein one outdoor unit and a plurality of indoor units among the plurality of units are connected to each other via a refrigerant pipe, and the one outdoor unit and the plurality of indoor units connected to each other are set as one group and configured to perform wireless communication with each other.

17. The air conditioner system of claim 16,
wherein a first refrigerant pipe connects a first outdoor unit with a plurality of first indoor units, and set as a first group,
wherein a second refrigerant pipe connects a second outdoor unit with a plurality of second indoor units, and set as a second group,
wherein the first group is configured to wirelessly communicate with each other through a first frequency and the second group is configured to wirelessly communicate with each other through a second frequency different than the first frequency.

18. The air conditioner system of claim 17, wherein different channels in the Sub-GHz band are allocated to the first group and the second group.

19. The air conditioner system of claim 1, wherein the plurality of units is distributed over at least two or more floors.

20. The air conditioner system of claim 19, wherein the at least one outdoor unit is provided on a roof of the building and the plurality of indoor units are distributed over multiple floors inside the building.

* * * * *